United States Patent
Okamoto et al.

(10) Patent No.: US 10,889,695 B2
(45) Date of Patent: Jan. 12, 2021

(54) TOW PREPREG, COMPOSITE MATERIAL-REINFORCED PRESSURE VESSEL, AND METHOD OF PRODUCING COMPOSITE MATERIAL-REINFORCED PRESSURE VESSEL

(71) Applicant: Mitsubishi Chemical Corporation, Chiyoda-ku (JP)

(72) Inventors: Satoshi Okamoto, Chiyoda-ku (JP); Yukihiro Harada, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/986,963

(22) Filed: May 23, 2018

(65) Prior Publication Data
US 2018/0265659 A1 Sep. 20, 2018

Related U.S. Application Data

(63) Continuation of application No. PCT/JP2016/086187, filed on Dec. 6, 2016.

(30) Foreign Application Priority Data

Dec. 10, 2015 (JP) ................. 2015-240729
Dec. 10, 2015 (JP) ................. 2015-240730

(51) Int. Cl.
| | | |
|---|---|---|
| C08J 5/24 | (2006.01) | |
| C08G 59/22 | (2006.01) | |
| C08G 59/68 | (2006.01) | |
| C08G 59/40 | (2006.01) | |
| F17C 1/02 | (2006.01) | |
| B29C 70/32 | (2006.01) | |
| B29K 63/00 | (2006.01) | |
| B29K 105/00 | (2006.01) | |
| B29K 307/04 | (2006.01) | |
| B29K 421/00 | (2006.01) | |
| B29L 31/00 | (2006.01) | |

(52) U.S. Cl.
CPC .............. *C08J 5/24* (2013.01); *C08G 59/226* (2013.01); *C08G 59/4021* (2013.01); *C08G 59/68* (2013.01); *F17C 1/02* (2013.01); *B29C 70/32* (2013.01); *B29K 2063/00* (2013.01); *B29K 2105/0094* (2013.01); *B29K 2307/04* (2013.01); *B29K 2421/00* (2013.01); *B29L 2031/7156* (2013.01); *C08J 2363/00* (2013.01); *C08J 2409/00* (2013.01); *C08J 2463/00* (2013.01); *F17C 2203/011* (2013.01); *F17C 2203/0604* (2013.01); *F17C 2203/0646* (2013.01); *F17C 2209/2163* (2013.01); *F17C 2221/012* (2013.01); *F17C 2270/0168* (2013.01); *F17C 2270/0184* (2013.01)

(58) Field of Classification Search
None
See application file for complete search history.

(56) References Cited

U.S. PATENT DOCUMENTS

| | | |
|---|---|---|
| 6,228,474 B1 | 5/2001 | Kishi et al. |
| 2006/0035088 A1 | 2/2006 | Takano et al. |
| 2011/0259514 A1 | 10/2011 | Boyle et al. |
| 2015/0148451 A1 | 5/2015 | Harada et al. |

FOREIGN PATENT DOCUMENTS

| | | |
|---|---|---|
| CN | 1717429 | 1/2006 |
| CN | 102108185 | 6/2011 |
| CN | 104379629 | 2/2015 |
| GB | 2505032 A | 2/2014 |
| JP | 55-015870 | 2/1980 |
| JP | 07-324119 | 12/1995 |
| JP | 09-087365 | 3/1997 |
| JP | 09-227693 | 9/1997 |
| JP | 2011-157491 | 8/2011 |
| JP | 2013-87124 A | 5/2013 |
| JP | 2013-525542 | 6/2013 |

(Continued)

OTHER PUBLICATIONS

Extended European Search Report dated Oct. 23, 2018 in corresponding European Patent Application No. 16872958.0, 5 pages.

(Continued)

*Primary Examiner* — Megan McCulley
(74) *Attorney, Agent, or Firm* — Oblon, McClelland, Maier & Neustadt, L.L.P.

(57) ABSTRACT

Provided are a tow prepreg comprising a reinforcing fiber bundle impregnated with a matrix resin composition, wherein the matrix resin composition contains a component (A) (an epoxy resin), a component (B) (dicyandiamide), a component (C) (a curing accelerator), and a component (D) (a core-shell type rubber particle), and a content of the component (D) with respect to 100 parts by mass of the component (A) is from 20 to 70 parts by mass, a viscosity is from 3 Pa·s to 80 Pa·s at 30° C., and a minimum viscosity to be obtained when a viscosity is measured by raising a temperature from room temperature to 130° C. at a rate of temperature rise of 2.0° C./min is from 0.04 Pa·s to 1 Pa·s, which exhibits excellent drape property and tackiness and less stickiness and can be unwound at a high speed; and a composite material-reinforced pressure vessel having fewer voids in a reinforcing layer which is obtainable by using the tow prepreg, a high burst pressure, and an excellent appearance due to appropriate resin flow.

14 Claims, 2 Drawing Sheets

(56) References Cited

FOREIGN PATENT DOCUMENTS

| | | |
|---|---|---|
| JP | 2013-527052 | 6/2013 |
| JP | 2014-227423 | 12/2014 |
| JP | 2015-048453 | 3/2015 |
| JP | 2015-098584 | 5/2015 |
| WO | WO 2011/130188 A2 | 10/2011 |
| WO | WO 2011/130188 A3 | 10/2011 |
| WO | WO 2013/183667 A1 | 12/2013 |

OTHER PUBLICATIONS

International Search Report dated Mar. 7, 2017 in PCT/JP2016/086187 filed Dec. 6, 2016 (with English Translation).
Written Opinion dated Mar. 7, 2017 in PCT/JP2016/086187 filed Dec. 6, 2016.
Canadian Office Action dated Jun. 4, 2019 in Canadian Patent Application No. 3,006.170; 3 pages.
Office Action in corresponding Chinese Application No. 201680071227.2 dated May 8, 2020. (w/English Translatioln).

TOW PREPREG, COMPOSITE MATERIAL-REINFORCED PRESSURE VESSEL, AND METHOD OF PRODUCING COMPOSITE MATERIAL-REINFORCED PRESSURE VESSEL

This application is a continuation application of International Application No. PCT/JP2016/086187, filed on Dec. 6, 2016, which claims the benefit of priority of the prior Japanese Patent Application No. 2015-240729 filed in Japan on Dec. 10, 2015 and the prior Japanese Patent Application No. 2015-240730 filed in Japan on Dec. 10, 2015, the entire contents of which are incorporated herein by reference.

TECHNICAL FIELD

The present invention relates to a tow prepreg, a composite material-reinforced pressure vessel fabricated using the tow prepreg, and a method of producing the composite material-reinforced pressure vessel.

The tow prepreg can also be used in general industrial applications such as sporting goods, motor vehicles, aircraft, and tendons in addition to the pressure vessels.

BACKGROUND ART

A pressure vessel fabricated by reinforcing a tank liner (hereinafter also referred to as "liner") with a fiber-reinforced composite material is utilized as a storage tank of compressed natural gas or hydrogen to be mounted on a moving body such as a motor vehicle since it is lightweight. Examples of the reinforcing fiber to be used in the fiber-reinforced composite material may include a glass fiber and a carbon fiber.

Among these, a carbon fiber is particularly suitably used in a storage tank of hydrogen to be required to exhibit higher pressure resistance performance than a storage tank of compressed natural gas since it has a high specific strength and is thus effective to decrease the weight of the pressure vessel.

A pressure vessel using a fiber-reinforced composite material (hereinafter also referred to as a "composite material-reinforced pressure vessel") is generally manufactured by filament winding (hereinafter referred to as "FW" in some cases) molding. FW molding is a molding method in which a matrix resin composition is supplied to and impregnated into one reinforcing fiber bundle or a plurality of reinforcing fiber bundles aligned, the impregnated reinforcing fiber bundle is wound onto a mandrel such as a rotating liner at a predetermined tensile force and a predetermined angle, and the matrix resin composition is then cured. In a number of cases, a step (FW step) of winding an impregnated reinforcing fiber bundle onto a mandrel such as a rotating liner or the like is continuously performed subsequently to a step (impregnation step) of supplying and impregnating a matrix resin composition into a reinforcing fiber bundle.

In addition, a tow prepreg in which a reinforcing fiber bundle is impregnated with a matrix resin composition is previously fabricated instead of supplying and impregnating a matrix resin composition to a reinforcing fiber bundle immediately before the FW step and the tow prepreg can also be used in the FW step. In this case as well, the tow prepreg is wound onto a mandrel such as a rotating liner at a predetermined tensile force and a predetermined angle.

It is variously advantageous to use a tow prepreg previously fabricated in FW molding. For example, it is not required to handle an uncured matrix resin composition in the manufacturing process of a pressure vessel and the working environment can be improved when a tow prepreg is used. In addition, the process speed of the FW step can be improved since the impregnation step is not required. Furthermore, a high-performance molded article is stably obtained as a tow prepreg having a controlled content rate of matrix resin composition is used.

Examples of the properties required for a tow prepreg may include the fact that the reinforcing fiber bundle is sufficiently impregnated with a predetermined amount of matrix resin composition and the fact that the reinforcing fiber bundle can be unwound from the state of being wound onto the bobbin at a high speed. Furthermore, it is required that troubles that the tow prepreg is wound onto the liner while being folded during the FW step are not caused.

In addition, in the step of winding the tow prepreg onto a mandrel such as a liner and then heating and curing the matrix resin composition contained in the tow prepreg, there is a case in which the matrix resin composition of which the viscosity is decreased by heating may flow out from the reinforcing fiber bundle by the gravity and winding tensile force of the tow prepreg to the liner. As a result, there is a case in which the matrix resin composition in the tow prepreg is insufficient and a great number of voids are formed in the fiber-reinforced composite material, the appearance of the composite material-reinforced pressure vessel deteriorates, or the amount of the matrix resin composition in the fiber-reinforced composite material changes, and thus the performance and quality of the composite material-reinforced pressure vessel to be obtained are adversely affected (hereinafter, it is referred to as "resin flow" that the matrix resin composition flows out from the tow prepreg in some cases). Hence, it is also required that the viscosity of the matrix resin composition is not too low in the step of heating and curing the matrix resin composition.

Meanwhile, the viscosity of the matrix resin composition is required to be low so that the reinforcing fiber bundle can be easily impregnated with the matrix resin composition and the tow prepreg fabricated can exhibit sufficient drape property and tackiness.

A method is known in which the viscosity of the matrix resin composition is decreased by using an epoxy resin having a low viscosity so that the reinforcing fiber bundle can be easily impregnated with the matrix resin composition, the tow prepreg fabricated can exhibit sufficient drape property and tackiness, and the tow prepreg can be unwound at a high speed (Patent Literature 1). In addition, as a method of weakening the tack of the tow prepreg and favorably maintaining the pliability of the tow prepreg, a method is known in which the viscosity of the matrix resin composition is increased to such an extent that the matrix resin composition is not sticky at the use environment temperature (usually room temperature) of the tow prepreg (Patent Literature 2).

CITATION LIST

Patent Document

Patent Document 1: JP 9-087365 A
Patent Document: JP 55-015870 A

DISCLOSURE OF THE INVENTION

Problem to be Solved by the Invention

However, there is a case in which the tow prepreg is folded by a guide roll or the like during the FW step and the shape of the tow prepreg greatly changes when a matrix resin composition having a low viscosity is used as in the technique disclosed in Patent Document 1.

In addition, the tow prepreg is usually wound onto a paper tube at a tensile force of about several hundred gf to 1 kgf, but at this time, there is a case in which a problem (hereinafter also referred to as "winding squeezing") arises that the matrix resin composition squeezes out from the tow prepreg and the tow prepreg positioned on the outer peripheral side has a higher matrix resin composition content than the tow prepreg positioned on the paper tube side.

Furthermore, there is a possibility that the viscosity of the matrix resin composition is too low, thus resin flow occurs in a great amount in the step of heating and curing the matrix resin composition, and a great number of voids are formed in the fiber-reinforced composite material layer of the composite material-reinforced pressure vessel to be obtained. As a result, there is a possibility that the pressure resistant performance and strength of the composite material-reinforced pressure vessel to be obtained decrease or the appearance thereof deteriorates.

In addition, it is difficult to sufficiently impregnate the reinforcing fiber bundle with the highly viscous matrix resin composition disclosed in Patent Document 2. In Patent Document 2, the matrix resin composition is dissolved in a solvent, impregnated into the reinforcing fiber bundle, and then heated and dried to remove the solvent, but in this method, the solvent remains in the tow prepreg obtained even though the amount is small. The residual solvent forms voids in the fiber-reinforced composite material fabricated using the tow prepreg so as to cause a great decrease in the strength and quality of the fiber-reinforced composite material.

In addition, Patent Document 2 does not disclose the resin flow amount in the heating and curing process of the matrix resin composition. However, in order to sufficiently suppress resin flow of the matrix resin composition by using the thermoplastic resin disclosed in Patent Document 2, for example, a polycarbonate resin having an average molecular weight of 40,000 or a polysulfone having an average molecular weight of 25,000, it is required to blend these in great amounts and the viscosity of the matrix resin composition is unnecessarily high at the use environment temperature (usually room temperature) of the tow prepreg, and thus there is a possibility that problems arise in the unwinding property and process passing property of the tow prepreg and the physical properties of the cured product of the matrix resin composition decrease.

The present invention has been made in view of the above background, and an object thereof is to provide a tow prepreg which exhibits excellent unwinding property from a bobbin, process passing property in a FW step, and shape retaining property and has appropriately adjusted resin flow at the time of curing and a composite material-reinforced pressure vessel which is obtained by using the tow prepreg and has stable quality and a high burst pressure.

Means for Solving Problem

As a result of intensive investigations to solve the above problems, the inventors of the present invention have found out that the above problems can be solved by using a tow prepreg satisfying a specific condition and thus completed the present invention.

In other words, the present invention relates to the following.

[1] A tow prepreg including a reinforcing fiber bundle impregnated with a matrix resin composition, in which the matrix resin composition contains a component (A), a component (B), a component (C), and a component (D), in which the component (A) is an epoxy resin, the component (B) is dicyandiamide, the component (C) is a curing accelerator, and the component (D) is a core-shell type rubber particle and a content of the component (D) with respect to 100 parts by mass of the component (A) is from 20 to 70 parts by mass, a viscosity of the matrix resin composition is from 3 Pa·s to 80 Pa·s at 30° C., and a minimum viscosity to be obtained when a viscosity of the matrix resin composition is measured by raising a temperature from room temperature to 130° C. at a rate of temperature rise of 2.0° C./min is from 0.04 Pa·s to 1 Pa·s.

[2] The tow prepreg according to [1], in which the component (A) contains a component (A1-1) and a component (A2), in which the component (A1-1) is a bifunctional epoxy resin which is liquid at 25° C. and has one or more aromatic rings in the molecule and the component (A2) is a bifunctional epoxy resin which has a viscosity of 15 Pa·s or less at 25° C. and does not have an aromatic ring in the molecule.

[3] The tow prepreg according to [2], in which the component (A2) is a component (A2-1), in which the component (A2-1) is a bifunctional epoxy resin which has a viscosity of 15 Pa·s or less at 25° C. and does not have an aromatic ring in the molecule but has one or more alicyclic structure in the molecule.

[4] The tow prepreg according to [3], in which a content of the component (A2-1) in the component (A) is from 2 to 80 parts by mass with respect to 100 parts by mass of the component (A).

[5] The tow prepreg according to any one of [1] to [4], in which the matrix resin composition has a curing completion time of shorter than 360 minutes at 100° C. when the curing completion time is measured using a curelastometer.

[6] The tow prepreg according to any one of [1] to [5], in which a total content of the component (B) and the component (C) with respect to 100 parts by mass of the component (A) is from 2 to 12 parts by mass.

[7] The tow prepreg according to any one of [1] to [6], in which a content of the component (C) with respect to 100 parts by mass of the component (A) is from 0.1 to 10 parts by mass.

[8] The tow prepreg according to any one of [1] to [7], in which the component (C) is a urea derivative or an imidazole derivative.

[9] The tow prepreg according to any one of [1] to [8], in which the reinforcing fiber bundle is a carbon fiber bundle.

[10] A composite material-reinforced pressure vessel including:

a metal liner or a resin liner; and a reinforcing layer disposed so as to cover a part or the whole of a surface of the metal liner or the resin liner, in which the reinforcing layer is a cured product of the tow prepreg according to any one of [1] to [9].

[11] A method of producing a composite material-reinforced pressure vessel, the method including:

a filament winding step of winding the tow prepreg according to any one of [1] to [9] onto a rotating metal liner or resin liner to fabricate a pressure vessel intermediate body; and a curing step of heating the pressure vessel intermediate body to cure the matrix resin composition contained in the tow prepreg.

[12] A method of producing a composite material-reinforced pressure vessel, the method including:

a preparation step of preparing a matrix resin composition which contains a component (A), a component (B), a component (C), and a component (D), in which the component (A) is an epoxy resin, the component (B) is dicyandiamide, the component (C) is a curing accelerator, and the component (D) is a core-shell type rubber particle and a content of the component (D) with respect to 100 parts by mass of the component (A) is from 20 to 70 parts by mass and has a viscosity of from 3 Pa·s to 80 Pa·s at 30° C. and a minimum viscosity of from 0.04 Pa·s to 1 Pa·s to be obtained when a viscosity of the matrix resin composition is measured by raising a temperature from room temperature to 130° C. at a rate of temperature rise of 2.0° C./min;

an impregnation step of impregnating a reinforcing fiber bundle with the matrix resin composition to fabricate a resin-impregnated reinforcing fiber bundle;

a filament winding step of winding the resin-impregnated reinforcing fiber bundle onto a rotating metal liner or resin liner to fabricate a pressure vessel intermediate body; and a curing step of heating the pressure vessel intermediate body to cure the matrix resin composition contained in the resin-impregnated reinforcing fiber bundle.

Effect of the Invention

The present invention can provide a tow prepreg which exhibits excellent drape property and tackiness and less stickiness and can be unwound at a high speed by highly accurately adjusting the viscosity of the matrix resin composition through adjustment of the amount of the core-shell type rubber particles to be contained in the matrix resin composition. Furthermore, it is possible to stably provide a composite material-reinforced pressure vessel having fewer voids, a high burst pressure, and an excellent appearance due to appropriate resin flow since the resin flow appropriately occurs in the step of heating and curing the matrix resin composition.

MODE(S) FOR CARRYING OUT THE INVENTION

Figure 1:
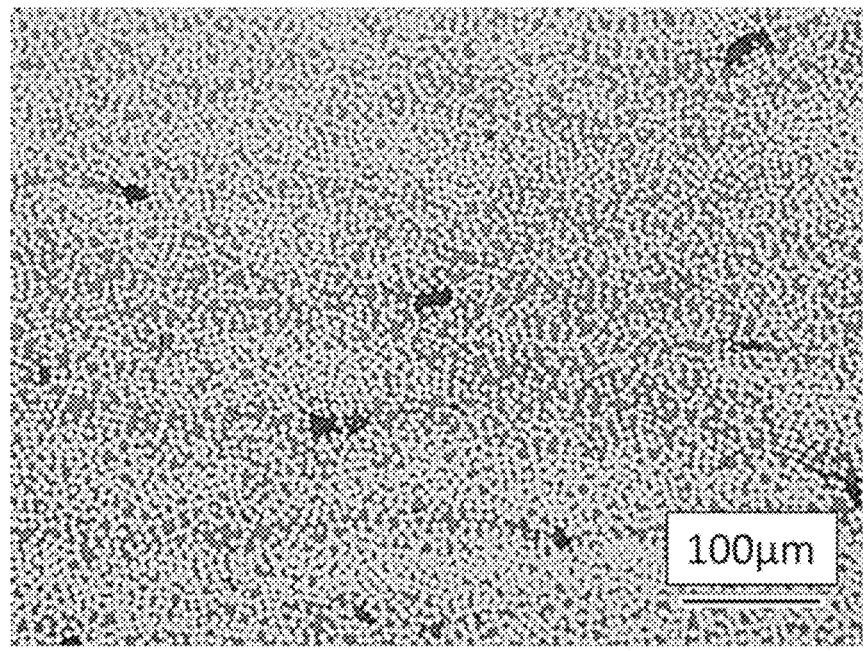
FIG. 1 is a cross-sectional photograph of the fiber-reinforced composite material layer portion corresponding to Laminate No. 1 of the composite material-reinforced pressure vessel obtained in Example 4.

The present invention relates to a tow prepreg obtained by impregnating a reinforcing fiber bundle with a matrix resin composition containing an epoxy resin (hereinafter also referred to as a "component (A)"), dicyandiamide (hereinafter also referred to as a "component (B)"), a curing accelerator (hereinafter also referred to as a "component (C)"), and core-shell type rubber particles (hereinafter also referred to as a "component (D)"), in which the content of the component (D) with respect to 100 parts by mass of the component (A) is from 20 to 70 parts by mass, the viscosity of the matrix resin composition is from 3 Pa·s to 80 Pa·s at 30° C., and the minimum viscosity (hereinafter also referred to as a "viscosity A") to be obtained when the viscosity of the matrix resin composition is measured by raising the temperature from room temperature to 130° C. at a rate of temperature rise of 2.0° C./min is from 0.04 Pa·s to 1 Pa·s.

Incidentally, the viscosity in the present invention is a value measured using a rheometer (rotary type dynamic viscoelasticity measuring device) unless otherwise stated.

<Tow Prepreg>

The tow prepreg is a narrow intermediate base material obtained by impregnating a reinforcing fiber bundle in which filaments of several thousands to several tens of thousands of reinforcing fibers are arranged in one direction with a matrix resin composition and then winding this onto a bobbin such as a paper tube.

Incidentally, in the present specification, one that is wound onto a bobbin or one that is unwound from the bobbin after being wound is referred to as a "tow prepreg", and a reinforcing fiber bundle which is simply impregnated with a matrix resin composition is referred to as a "resin-impregnated reinforcing fiber bundle".

The tow prepreg of the present invention is obtained by impregnating a reinforcing fiber bundle with a matrix resin composition to be described later.

(Reinforcing Fiber Bundle)

The fiber diameter and number of the filaments constituting the reinforcing fiber bundle are not particularly limited, but the fiber diameter is preferably from 3 to 100 μm, more preferably from 4 to 30 pin, and still more preferably from 5 to 15 μm and the number of filaments is preferably from 1,000 to 70,000, more preferably from 3,000 to 60,000, and still more preferably from 5,000 to 50,000.

Incidentally, in the present specification, the "fiber diameter" means the equal area equivalent circle diameter of the cross section of each fiber.

When the fiber diameter of the filaments constituting the reinforcing fiber bundle is equal to or larger than the lower limit value, it is possible to suppress cutting or occurrence of fluff accumulation, for example, when a filament laterally moves (it means to move in the direction orthogonal to the fiber direction. The same applies hereinafter) on the surface of a roll, a bobbin, or the like in various kinds of processing processes, and it is possible to suppress a decrease in flexibility due to an increase in hardness of the filament when the fiber diameter is equal to or smaller than the upper limit value.

In the reinforcing fiber bundle, it is possible to use a reinforcing fiber to be used in an ordinary fiber-reinforced composite material such as a glass fiber, a carbon fiber (incidentally, a graphite fiber is also treated to be included in the carbon fiber in the present invention), an aramid fiber, and a boron fiber. Among these, a carbon fiber having a high specific strength is preferable, a carbon fiber having a strand strength of 3500 MPa or more in conformity to JIS R7601 is more preferable, a carbon fiber having a strand strength of 4500 MPa or more is still more preferable, and a carbon fiber having a strand strength of 5000 MPa or more is particularly preferable.

It is more preferable as the strand strength of the carbon fiber bundle to be used is higher in a case in which the tow prepreg of the present invention is used in a pressure vessel or a tension member.

Incidentally, in a case in which the reinforcing fiber bundle is a carbon fiber bundle, the fiber diameter of the filament is preferably from 3 to 12 μm, more preferably from 4 to 9 μm, and still more preferably from 4 to 7 μm and the number of filaments is preferably from 1,000 to 70,000, more preferably from 6,000 to 60,000, and still more preferably from 12,000 to 50,000.

When the fiber diameter is equal to or larger than the lower limit value, it is possible to suppress cutting or occurrence of fluff accumulation, for example, when a filament laterally moves on the surface of a roll, a bobbin, or the like in various kinds of processing processes, and it is easy to manufacture the carbon fiber when the fiber diameter is equal to or smaller than the upper limit value.

(Unwinding Property of Tow Prepreg)

Although the method of manufacturing the tow prepreg will be described later, unlike a sheet-like prepreg, usually the surface of tow prepreg is not covered with a film or a release paper but the tow prepreg is directly wound onto a paper tube or the like as it is in the same manner as a glass fiber bundle or a carbon fiber bundle. Thereafter, the tow prepreg thus wound onto the paper tube is unwound and used.

Hence, there arises a problem that it is impossible to unwind the tow prepreg at a high speed since the resistance at the time of unwinding is strong or it is not easy to unwind the tow prepreg since a single yarn of the reinforcing fiber bundle is entangled on the surface of the tow prepreg wound onto the paper tube when the tackiness of the tow prepreg is too strong.

(Tack of Tow Prepreg)

The tack of the tow prepreg can be expressed as an average maximum stress value. Incidentally, in the present specification, the stress value means a tensile stress to be generated on the contact surface between the plunger and the sample, and the average maximum stress value means a value obtained through a tack test to be described below.

(Tack Test)

Apparatus: Tack Tester TA-500 (manufactured by UBM)
Contact area of plunger with sample: about 3.1 $cm^2$
Plunger pushing time: 10 seconds
Plunger pushing pressure: 90,000 Pa
Plunger lifting speed: 1 mm/sec
Temperature of measurement environment: 23° C.
Humidity of measurement environment: 50% RH
Procedure:

1) The tow prepreg is fixed on the sample stage. At this time, the surface of the tow prepreg to be in contact with the plunger is set to be the inside surface (namely, the surface on the paper tube side) when the tow prepreg is wound onto the paper tube.

2) The plunger is pushed against the tow prepreg for 10 seconds by applying a pressure of 90,000 Pa.

3) The plunger is lifted at the speed of 1 mm/sec.

4) The maximum value of the stress value while lifting the plunger is taken as the maximum stress value, the measurement is conducted three times in total, and the average value of the maximum stress values thus obtained is taken as the average maximum stress value.

The average maximum stress value of the tow prepreg of the present invention is preferably 2 kPa or more and 65 kPa or less and still more preferably 10 kPa or more and 50 kPa or less. When the average maximum stress value of the tow prepreg is equal to or greater than the lower limit value, it is possible to impart appropriate adhesive property to the mandrel in the FW step and to avoid a problem that the tow prepreg slips when being wound onto the mandrel. In addition, when the average maximum stress value prepreg is equal to or smaller than the upper limit value, it is possible to unwind the tow prepreg from the bobbin at a high speed and to prevent the tow prepreg after being unwound from being wound onto the liner while being folded.

(Viscosity of Matrix Resin Composition at Environment Temperature to Use Tow Prepreg)

The viscosity of the matrix resin composition impregnated into the tow prepreg may be mentioned as a major factor which affects the degree of strength of the tackiness and drape property of the tow prepreg. In particular, the viscosity of the matrix resin composition at the environment temperature at which the tow prepreg is used greatly affects the tackiness and drape property of the tow prepreg.

In the tow prepreg of the present invention, the viscosity of the matrix resin composition at 30° C. is from 3 Pa·s to 80 Pa·s, preferably from 5 Pa·s to 70 Pa·s, and still more preferably from 5 Pa·s to 50 Pa·s.

A tow prepreg exhibiting excellent unwinding property from the bobbin, tackiness, and drape property is obtained when the viscosity of the matrix resin composition at 30° C. is within the above range.

When the viscosity of the matrix resin composition at 30° C. is equal to or lower than the upper limit value, the tackiness of the tow prepreg is not too strong, and the tow prepreg exhibits appropriate drape property, and it is thus possible to wind the tow prepreg onto a liner without forming a gap between adjacent tow prepregs when the tow prepreg is wound onto a mandrel such as a liner.

In addition, when the viscosity of the matrix resin composition at 30° C. is equal to or higher than the lower limit value, the tow prepreg exhibits appropriate tackiness and it is possible to impart appropriate adhesive property to a mandrel such as a liner and to avoid a problem that the tow prepreg slips when being wound onto the mandrel. In addition, the tow prepreg is not too soft, and it is thus possible to prevent the shape change of the tow prepreg when the tow prepreg passes through the guide in the FW step.

(Viscosity of Matrix Resin Composition at Temperature to Cure Tow Prepreg)

The viscosity of the matrix resin composition impregnated into the tow prepreg may be mentioned as a major factor which influences the resin flow of the tow prepreg. In particular, the viscosity of the matrix resin composition at the temperature at which the tow prepreg is cured greatly influences the resin flow of the tow prepreg.

In the tow prepreg of the present invention, the viscosity A of the matrix resin composition is from 0.04 Pa·s to 1 Pa·s and preferably 0.05 Pa·s to 0.5 Pa·s.

It is possible to generate appropriate resin flow during curing when the viscosity A of the matrix resin composition is within the above range.

It is possible to prevent the following troubles when the viscosity A of the matrix resin composition is equal to or lower than the upper limit value.

The resin flow occurs in a too small amount during the curing process, thus gaps between the tow prepregs formed when winding the tow prepreg are not buried, and a great number of voids are formed in the reinforcing layer of the composite material-reinforced pressure vessel.

The matrix resin composition is not almost present on the surface layer of the reinforcing layer of the composite material-reinforced pressure vessel, the reinforcing fiber bundle is exposed, and the appearance of the composite material-reinforced pressure vessel deteriorates.

In addition, it is possible to prevent the following troubles when the viscosity A of the matrix resin composition is equal to or higher than the lower limit value.

The resin flow occurs in a too large amount during the curing process, thus the matrix resin composition in the tow prepreg is insufficient, and a great number of voids are formed in the reinforcing layer of the composite material-reinforced pressure vessel.

The appearance of the composite material-reinforced pressure vessel deteriorates.

(Content of Matrix Resin Composition)

The content of the matrix resin composition impregnated into the tow prepreg may be mentioned as another factor which affects the degree of strength of the tackiness of the tow prepreg.

The content of the matrix resin composition in 100% by mass of the tow prepreg of the present invention is preferably 20% by mass or more and 40% by mass or less. When the content of the matrix resin composition in 100% by mass of the tow prepreg is equal to or more than the lower limit value, it is possible to easily spread a sufficient amount of the matrix resin composition in the reinforcing fiber bundle and to prevent the formation of voids in the fiber-reinforced composite material to be obtained. In addition, it is possible to impart appropriate tackiness to the tow prepreg when the content is equal to or less than the upper limit value. Furthermore, it is possible to increase the fiber-containing volume fraction in the fiber-reinforced composite material and thus the mechanical properties of the fiber-reinforced composite material to be obtained are effectively developed.

Particularly, in order to fabricate a tow prepreg from which a fiber-reinforced composite material exhibiting excellent unwinding property, process passing property, and shape retaining property and high mechanical properties is obtained, it is preferable to set the content of the matrix resin composition in 100% by mass of the tow prepreg to 20% by mass or more and 30% by mass or less.

In addition, the content of the matrix resin composition impregnated into the tow prepreg greatly influences handling property of the tow prepreg and the rate of fiber strength development. The rate of fiber strength development of the reinforcing fiber is the proportion of the tensile strength in the fiber direction of the fiber-reinforced composite material containing the reinforcing fiber with respect to the tensile strength (strand strength) of the reinforcing fiber itself.

By setting the content of the matrix resin composition in 100% by mass of the tow prepreg to be equal to or more than the lower limit value, it is possible to easily spread a sufficient amount of the matrix resin composition in the reinforcing fiber bundle and to increase the rate of fiber strength development.

(Matrix Resin Composition)

[Component (A): Epoxy Resin]

Component (A) is an epoxy resin. In the present specification, the term "epoxy resin" is used as the name of a category of chemical substances which are compounds having one or more epoxy groups in the molecule.

Epoxy resins may be used singly or two or more kinds thereof may be used concurrently.

The component (A) contains preferably a bifunctional epoxy resin having an aromatic ring in the molecule (hereinafter also referred to as a "component (A1)") and particularly preferably a bifunctional epoxy resin which is liquid at 25° C. and has an aromatic ring in the molecule (hereinafter also referred to as a "component (A1-1)").

Incidentally, the "bifunctional epoxy resin" means an epoxy resin having two epoxy groups in the molecule.

By using the component (A1-1), it is possible to adjust the viscosity of the matrix resin composition to a proper range and to adjust the mechanical properties of the cured product to an adequate range. Examples of the aromatic ring contained in the component (A1) may include a benzene ring, a naphthalene ring, and a fluorene ring.

Specific examples of the epoxy resin may include diglycidyl ether type epoxy resins such as a bisphenol A type epoxy resin, a bisphenol F type epoxy resin, a bisphenol S type epoxy resin, a resorcinol type epoxy resin, a hydroquinone type epoxy resin, a bisphenoxyethanolfluorene type epoxy resin, a bisphenolfluorene type epoxy resin, a biscresolfluorene type epoxy resin, and a novolac type epoxy resin and diglycidyl ester type epoxy resins such as a terephthalic acid type epoxy resin, but the epoxy resin is not limited thereto.

From the viewpoint of being able to easily adjust the viscosity of the matrix resin composition to a proper range and to adjust the mechanical properties of the cured product to an adequate range, a bisphenol A type epoxy resin which is liquid at 25° C. and has an aromatic ring in the molecule is preferable and a bisphenol A type epoxy resin which is liquid at 25° C. and has an epoxy equivalent of 170 g/eq or more and 200 g/eq or less is particularly preferable among the components (A1-1).

The content of the component (A1) in 100 parts by mass of the component (A) is preferably from 10 to 100 parts by mass and more preferably from 25 to 100 parts by mass. It is possible to obtain a cured product of the matrix resin composition having favorable mechanical properties when the content of the component (A1) in 100 parts by mass of the component (A) is equal to or more than the lower limit value.

In addition, the content of the component (A1-1) in 100 parts by mass of the component (A) is preferably from 20 to 100 parts by mass and more preferably from 50 to 100 parts by mass in a case in which the component (A) contains the component (A1-1). When the content of the component (A1-1) in 100 parts by mass of the component (A) is equal to or more than the lower limit value, it is easier to adjust the viscosity of the matrix resin composition at 30° C. described above to a proper range as well as it is possible to obtain a cured product of the matrix resin composition having favorable mechanical properties.

In addition, it is preferable that the component (A) contains an epoxy resin which does not have an aromatic ring in the molecule and has a relatively low viscosity, specifically, a bifunctional epoxy resin having a viscosity of 15 Pa·s or less at 25° C. (hereinafter also referred to as a "component (A2)").

By concurrently using the component (A2) having a low viscosity, it is possible to easily adjust the viscosity of the matrix resin composition at the environment temperature at which the tow prepreg is used to a proper range and to provide a tow prepreg exhibiting excellent unwinding property, drape property, and tackiness. Furthermore, it is possible to easily adjust the viscosity A of the matrix resin composition to a range in which appropriate resin flow occurs during the curing process.

In addition, the component (A2) is preferably a bifunctional epoxy resin which has an alicyclic structure in the molecule as well as has a viscosity of 15 Pas or less at 25° C. and does not have an aromatic ring in the molecule (hereinafter also referred to as a "component (A2-1)"). By containing the epoxy resin having an alicyclic structure, the viscosity of the matrix resin composition to be used in the present invention decreases and the rate of fiber strength development in the fiber-reinforced composite material can be increased. In particular, a compound in which a substituent having an epoxy group such as a glycidyl group is bonded to an aliphatic ring is far more preferable since a cured product exhibiting high heat resistance can be obtained by blending this compound into the matrix resin composition.

Examples of the compound in which a substituent having an epoxy group such as a glycidyl group is bonded to an aliphatic ring may include hexahydrophthalic acid diglycidyl ester, methyltetrahydrophthalic acid diglycidyl ester, and cyclohexanedimethanol diglycidyl ether, but hexahydrophthalic acid diglycidyl ester is particularly preferable from the viewpoint of the above effects.

The content of the component (A2) in 100% by mass of the component (A) is preferably from 2 to 80 parts by mass, more preferably from 2 to 50 parts by mass, and still more preferably from 4 to 35 parts by mass.

It is possible to easily adjust the viscosity of the matrix resin composition when the content of the component (A2) in the component (A) is equal to or more than the lower limit value, and it is possible to suppress the viscosity of the matrix resin composition from being lower than necessary and it is easy to maintain high heat resistance of the cured product of the matrix resin composition and high reactivity of the matrix resin composition when the content is equal to or less than the upper limit value.

In addition, the content of the component (A2-1) in 100 parts by mass of the component (A) is preferably from 2 to 80 parts by mass, more preferably from 2 to 50 parts, and still more preferably from 4 to 35 parts by mass in a case in which the component (A) contains the component (A2-1).

The effect by the epoxy resin having an alicyclic structure described above is sufficiently exerted when the content of the epoxy resin having an alicyclic structure in the component (A) is within the above range.

In other words, when the content of the epoxy resin having an alicyclic structure in the component (A) is equal to or more than the lower limit value, it is possible to appropriately decrease the viscosity of the matrix resin composition and to increase the rate of fiber strength development in the fiber-reinforced composite material to be obtained. In particular, it is preferable that the epoxy resin is a compound in which a substituent having an epoxy group such as a glycidyl group is bonded to an aliphatic ring from the viewpoint of increasing heat resistance of the cured product of the matrix resin composition as well. In addition, it is easy to maintain high heat resistance of the cured product of the matrix resin composition and high reactivity of the matrix resin composition when the content of the epoxy resin having an alicyclic structure in the component (A) is equal to or less than the upper limit value.

The component (A) contains preferably the component (A1) and the component (A2), more preferably the component (A1-1) and the component (A2), and still more preferably the component (A1-1) and the component (A2-1).

As the component (A), various kinds of epoxy resins can be used in addition to the component (A1) and the component (A2) for the purpose of improving the heat resistance and adjusting the viscosity. Examples thereof may include a trifunctional or higher functional epoxy resin or a bifunctional epoxy resin other than the component (A1) and component (A2) which have an aliphatic skeleton.

Examples of the trifunctional epoxy resin may include a triazine skeleton-containing epoxy resin, an aminophenol type epoxy resin, and an aminocresol type epoxy resin.

Examples of tetrafunctional or higher functional epoxy resins may include a cresol novolac type epoxy resin, a phenol novolak type epoxy resin, and an aromatic glycidyl amine type epoxy resin.

The preferred range of the content of the epoxy resin other than the component (A1) and the component (A2) varies depending on the kind of resin and the purpose of blending, but it is preferable to select the preferred range so that the viscosity and viscosity A of the matrix resin composition to be impregnated into the tow prepreg of the present invention at 30° C. are in the above ranges.

[Component (B): Dicyandiamide]

The component (B) is dicyandiamide.

The component (B) is a particulate thermally activated type latent curing agent, and the matrix resin composition containing this exhibits excellent stability, specifically, excellent stability in the preparation step, excellent storage stability at room temperature, and excellent stability against heat to receive in the step of impregnating the reinforcing fiber bundle with the matrix resin composition.

In other words, the component (B) hardly dissolves in the epoxy resin component at the environment temperature (specifically, 20° C. to 30° C.) at which a general tow prepreg is used, a step (specifically, 40° C. to 60° C.) of preparing the matrix resin composition, and the step (specifically, 60° C. to 80° C.) of impregnating the reinforcing fiber bundle with the matrix resin composition but is present in a state of being dispersed in the epoxy resin component while maintaining a particulate shape, and thus the area of the component (B) in contact with the epoxy group in the epoxy resin is small and is hardly reactive with the epoxy resin.

In addition, the component (B) has a particulate shape, and thus an effect of preventing the single fibers from being densely filled is obtained by containing the component (B) in the reinforcing fiber bundle. This makes it possible to increase the volume of gaps in the reinforcing fiber bundle and to impregnate the reinforcing fiber bundle with a larger amount of matrix resin composition. It is possible to decrease the matrix resin composition present on the surface of tow prepreg when a sufficient amount of the matrix resin composition can be impregnated into the tow prepreg, and it is possible to adjust the tack of tow prepreg to an appropriate range by decreasing the matrix resin composition present on the surface of tow prepreg. In addition, it is possible to suppress distortion in the winding form of tow prepreg caused as the tow prepreg slips when being wound onto the bobbin.

[Component (C): Curing Accelerator]

The component (C) is a curing accelerator.

The curing accelerator may be used singly or two or more kinds thereof may be used concurrently. The component (C) is used in order to enhance the curability of the component (B). Examples of the curing accelerator may include a urea derivative, an imidazole derivative, an epoxy resin imidazole adduct compound, an epoxy resin amine adduct compound, a modified aliphatic amine compound, a Lewis acid complex, an onium salt, and a phenol compound.

Among these, a urea derivative and an imidazole derivative are suitably used from the viewpoint of being able to exhibit the storage stability and curability at a low temperature of the matrix resin composition in a balance, and particularly, 3-phenyl-1,1-dimethylurea, 3-(3,4-dichlorophenyl)-1,1-dimethylurea, 3-(3-chloro-4-methylphenyl)-1,1-dimethylurea, 4,4'-methylenebis(diphenyldimethylurea), 2,4-toluenebis(3,3-dimethylurea), and the like are preferable as the urea derivative and 2,4-diamino-6-[2-(2-methyl-1-imidazolyl)ethyl]-1,3,5-triazine, 1-cyano-2-phenylimidazolium trimellitate, and the like are preferable as the imidazole derivative.

The content of the component (C) in the matrix resin composition varies depending on the kind of the component (C) and the desired curing temperature, but the content is preferably from 0.1 to 10 parts by mass, more preferably from 0.3 to 8 parts by mass, and still more preferably from 0.5 to 7 parts by mass with respect to 100 parts by mass of the component (A) in order to adjust the tackiness and storage stability of the tow prepreg to be obtained, and the quantity of heat generated at the time of curing, and the properties of the cured product to adequate ranges.

Incidentally, the total content of the component (B) and the component (C) with respect to 100% by mass of the component (A) is preferably from 2 to 12 parts by mass and more preferably from 3 to 9 parts by mass.

It is possible to enhance the curability at a low temperature when the total content of the component (B) and the component (C) with respect to the component (A) is equal to or more than the lower limit value, and the tack of the tow prepreg to be obtained does not decrease too low when the total content is equal to or less than the upper limit value.

When the content of the component (B) with respect to the component (A) is within a proper range to be derived from the above, it is possible to adjust the tack of the tow prepreg to be obtained, the storage stability of the matrix resin composition, the quantity of heat generated at the time of curing, and the properties of the cured product to adequate ranges.

[Component (D): Core-Shell Type Rubber Particle]

The component (D) is core-shell type rubber particles.

The component (D) may be used singly or two or more kinds thereof may be used concurrently.

By blending the component (D) into the matrix resin composition, it is possible to increase the viscosity A without significantly increasing the viscosity of the matrix resin composition at 30° C. and to improve the toughness without impairing the heat resistance of the cured product of the matrix resin composition.

The "core-shell type rubber particles" are rubber particles in which a part or the whole of the surface of a particulate core component is covered with a shell component by graft-polymerizing a shell component polymer of a different kind from that of the core component on the surface of the particulate core component containing a crosslinked rubbery polymer as a main component (it means that the crosslinked rubbery polymer accounts for 50 parts by mass or more in 100 parts by mass of the particulate core component).

Examples of the core component constituting the component (D) may include a butadiene rubber (BR), an acrylic rubber (ACM), a silicone rubber (Si), a butyl rubber (TIR), a nitrile rubber (NBR), a styrene butadiene rubber (SBR), an isoprene rubber (IR), and an ethylene propylene rubber (EPR). Among these, a crosslinked rubbery polymer composed of styrene and butadiene is preferable since it exhibits a high toughness improving effect.

It is preferable that the shell component constituting the component (D) is graft-polymerized to the core component described above and forms a covalent bond with the polymer constituting the core component.

As a component constituting such a shell component, it is possible to use, for example, a polymer obtained by polymerizing at least one kind selected from the group consisting of an acrylic acid ester-based monomer, a methacrylic acid ester-based monomer, and an aromatic vinyl monomer.

In a case in which a crosslinked rubbery polymer composed of styrene and butadiene is used as the core component, one obtained by graft-polymerizing a mixture of methyl methacrylate which is a (meth)acrylic acid ester and styrene which is an aromatic vinyl compound to the core component is preferable as the shell component.

In addition, it is preferable that a functional group which reacts with the component (A) is introduced into the shell component in order to stabilize the state of the particles dispersed in the matrix resin composition.

Examples of such a functional group may include a hydroxyl group, a carboxyl group, and an epoxy group, and among these, an epoxy group is preferable. As a method of introducing the epoxy group, there is a method in which, for example, glycidyl methacrylate and the shell component are concurrently graft-polymerized to the core component.

Commercially available products can also be used as the component (D).

Specific examples of the commercially available products may include core-shell type rubber particles using an acrylic rubber (product name "W-5500" (manufactured by Mitsubishi Rayon Co., Ltd.) and product name "J-5800" (manufactured by Mitsubishi Rayon Co., Ltd.)), core-shell type rubber particles using a silicone-acrylic composite rubber (product name "SRK-200E" (manufactured by Mitsubishi Rayon Co., Ltd.)), core-shell type rubber particles composed of butadiene-alkyl methacrylate-styrene copolymer (product name "PARALOID EXL-2655" (manufactured by KUREHA CORPORATION)), core-shell type rubber particles composed of an acrylate-methacrylate copolymer (product name "STAPHYLOID AC-3355" (manufactured by Takeda Pharmaceutical Company Limited) and product name "TR-2122" (manufactured by Takeda Pharmaceutical Company Limited)), and core-shell type rubber particles composed of a butyl acrylate-methyl methacrylate copolymer (product name "PARALOID EXL-2611" (manufactured by Rohm and Haas Company) and product name "EXL-3387" (manufactured by Rohm and Haas Company)).

The component (D) may be dispersed into the component (A) using a stirrer, a roll mill, or the like at the time of preparation of the matrix resin composition, but it is preferable to use a master batch type core-shell type rubber particle-dispersed epoxy resin in which the component (D) is previously dispersed in the component (A) since it is possible to shorten not only the preparation time of the matrix resin composition but also to improve the state of the component (D) dispersed in the matrix resin composition.

Examples of such a master batch type core-shell type rubber particle-dispersed epoxy resin may include an epoxy resin containing an acrylic rubber (product name "BPF 307" (manufactured by NIPPON SHOKUBAI CO., LTD.) and product name "BPA 328" (manufactured by NIPPON SHOKUBAI CO., LTD.)); an epoxy resin containing core-shell type rubber particles composed of a core component of a copolymer of styrene and butadiene and a shell component which contains methyl methacrylate and has a functional group to react with an epoxy group (product name "MX-113" (manufactured by KANEKA CORPORATION) and product name "MX-416" (manufactured by KANEKA CORPORATION)), an epoxy resin containing a butadiene rubber (product name "MX-156" (manufactured by KANEKA CORPORATION)), and an epoxy resin containing a silicone rubber (product name "MX-960" (manufactured by KANEKA CORPORATION).

The content of the component (D) with respect to 100% by mass of the component (A) is from 20% to 70% by mass and more preferably from 30% to 45% by mass particularly in order to increase the viscosity A without greatly increasing the viscosity of the matrix resin composition at 30° C.

When the content of the component (D) with respect to the component (A) is equal to or more than the lower limit value, it is possible to sufficiently obtain the effect of increasing the viscosity A and to prevent the resin flow from being too great in the curing process. The composite material-reinforced pressure vessel obtained by using such a matrix resin composition is preferable from the viewpoint of being able to realize a high tank burst pressure (burst pressure) as well.

When the content of the component (D) with respect to the component (A) is equal to or less than the upper limit value, it is possible to prevent the resin flow from being too small in the curing process as the viscosity A increases. The composite material-reinforced pressure vessel obtained by using such a matrix resin composition is preferable from the viewpoint of being able to realize a high tank burst pressure (burst pressure) as well.

The primary particle diameter of the component (D) in the cured product of the matrix resin composition is preferably from 30 nm to 1000 nm and more preferably from 50 nm to 500 nm.

It is preferable that the primary particle diameter of the component (D) in the cured product of the matrix resin composition is equal to or greater than the lower limit value since it is possible to keep the viscosity of the matrix resin composition appropriately low at the environment temperature (specifically, 20° C. to 30° C.) at which a general tow prepreg is used, a step (specifically, 40° C. to 60° C.) of preparing the matrix resin composition, and the step (specifically, 60° C. to 80° C.) of impregnating the reinforcing fiber bundle with the matrix resin composition and it is thus easier to prepare the matrix resin composition and to fabricate the tow prepreg. It is possible to sufficiently obtain an effect of increasing the viscosity A and to prevent the resin flow from being too great in the curing process when the primary particle diameter is equal to or smaller than the upper limit value. The composite material-reinforced pressure vessel obtained by using such a matrix resin composition is preferable from the viewpoint of being able to realize a high tank burst pressure (burst pressure) as well.

Here, the primary particle diameter of the component (D) represents the volume average particle diameter of primary particles and can be measured using, for example, a Nanotrac particle size distribution measuring device (manufactured by NIKKISO CO., LTD.).

[Arbitrary Component]

Into the matrix resin composition, inorganic particles such as a silica powder, aerosil, microballoon, antimony trioxide, alumina, and titanium oxide, a flame retardant such as a phosphorus compound, carbon particles such as carbon black and activated carbon, and additives such as a defoaming agent and a wetting agent may be blended according to the purpose in a range in which the effect of the present invention is not impaired.

(Low Temperature Curability of Matrix Resin Composition)

The liner of the composite material-reinforced pressure vessel is roughly divided into a metal liner such as an aluminum liner and a plastic liner such as a polyamide liner or a polyethylene liner. A pressure vessel fabricated by reinforcing a plastic liner with a fiber-reinforced composite material is superior to a pressure vessel using a metal liner since it is lighter and less expensive. However, the matrix resin composition to be impregnated into the reinforcing fiber bundle is often cured by heat, and it is thus concerned that the liner inside the vessel is deformed or degraded as the heat generated by the curing reaction of the resin itself is added to the liner in addition to the heat at the time of curing of the matrix resin composition.

In a case in which the tow prepreg is wound onto the plastic liner in the FW step and the matrix resin composition contained in the tow prepreg is cured by heat, it is required to cure the matrix resin composition at a low temperature (80° C. to 120° C.) at which the plastic liner is not deformed or degraded. In addition, it is possible to shorten the molding cycle and to improve the productivity of the pressure vessel by completing the curing in a shorter time.

The curability of the matrix resin composition at a certain temperature can be measured using a curelastometer. A curelastometer is a testing machine which measures the vulcanization properties of compounded rubber and the curing process of a thermosetting resin, and it measures a change in stress (torque) generated when the vibration deformation is applied at a constant amplitude of vibrations at a certain temperature and a certain pressure with time.

The matrix resin composition has a curing-completed time of preferably shorter than 360 minutes and more preferably shorter than 240 minutes at 100° C. when measured using a curelastometer.

For the measurement using a curelastometer, a test is conducted in conformity to the industry standard JIS K6300 for the rubber vulcanization test. At this time, the frequency of vibrations is set to 100 cpm, the angle of amplitude of vibrations is set to ±¼°, and the dice shape is set to WP-100.

The torque-time curve by a curelastometer is a curve obtained by taking the torque measured as the vertical axis and the time as the horizontal axis. Usually, the torque increases as the curing reaction of resin proceeds and the torque reaches saturation as the curing reaction approaches the end.

The curing-completed time in the present invention is defined as the time required until the inclination of the tangential line to the torque-time curve becomes ⅟₃₀ of the maximum value after the inclination becomes the maximum value.

The matrix resin composition exhibiting such curability can be easily obtained by blending the components (A) to (D) described above and preparing the composition so as to exhibit the viscosity property described above.

(Method of Preparing Matrix Resin Composition)

The matrix resin composition for tow prepreg of the present invention can be manufactured by various known methods. For example, there is a method in which the respective components are kneaded using a planetary mixer or a kneader. The components of the present invention are dispersed in the component (A) while maintaining a particulate shape in some cases, but there is a possibility that the component (B) is poorly dispersed since it is cohesive. Hence, it is preferable to prepare a master batch by preliminarily kneading the component (B) or a part of the particulate component (C) using a part of the component (A). It is preferable to use a kneading apparatus such as a triple roll mill or a ball mill for the preliminary kneading. By previously preparing a master batch of the component (B) or a part of the particulate component (C), it is possible to prevent unevenness of the physical properties in the cured product due to poor dispersion, poor curing, and poor impregnation of the matrix resin composition into the reinforcing fiber bundle.

(Method of Manufacturing Tow Prepreg)

The tow prepreg of the present invention can be fabricated by a known manufacturing method, but among these, it is preferable to manufacture the tow prepreg through the following steps (1) to (4).

Step (1): a tensional force is applied to the reinforcing fiber bundle drawn out from the bobbin and the reinforcing fiber bundle is widened (by heating if necessary).

Step (2): a matrix resin composition (heated if necessary) is supplied to at least one side of the reinforcing fiber bundle thus widened so that the matrix resin composition supplied to a unit amount of reinforcing fiber bundle becomes a predetermined amount.

Step (3): the matrix resin composition thus supplied is impregnated into the reinforcing fiber bundle to obtain a resin-impregnated reinforcing fiber bundle.

Step (4): the resin-impregnated reinforcing fiber bundle is wound onto a bobbin such as a paper tube (after being cooled to room temperature if necessary).

The reinforcing fiber bundle to be impregnated with the matrix resin composition preferably has a widened width and a flat shape since the contact area with the matrix resin composition becomes wide.

Examples of the method of widening the reinforcing fiber bundle may include a method in which the reinforcing fiber bundle is scraped on the cylindrical bar, a method in which vibrations are applied to the reinforcing fiber bundle, and a method in which the reinforcing fiber bundle is crushed.

Furthermore, it is preferable to heat the reinforcing fiber bundle when widening the reinforcing fiber bundle, and usually, it is more preferable to heat the reinforcing fiber bundle to about 50° C. to 150° C. although the temperature also depends on the kind of sizing agent attached to the reinforcing fiber. In addition, by heating the reinforcing fiber bundle at the time of widening, there is also an effect that the temperature of the matrix resin composition to be impregnated into the reinforcing fiber bundle does not decrease in the subsequent step (3). The heating method is not particularly limited, and it is possible to use either of contact heating using a heating body or a non-contact heating method such as infrared heating or atmosphere heating.

The widening of the reinforcing fiber bundle in the step (1) may be conducted in-line or off-line. For example, commercially available widened tape-like reinforcing fiber bundles are regarded as reinforcing fiber bundles off-line widened.

Examples of a method of supplying the matrix resin composition to the reinforcing fiber bundle may include a "resin bath method" in which the reinforcing fiber bundle passes through the interior of the resin bath to be impregnated with the matrix resin composition and then the resin content is adjusted by squeezing the excess matrix resin composition using an orifice, a roll, and the like, a "rotating roll method" of a transfer roll impregnation method (for example, impregnation method using a rotating drum having a doctor blade) in which a matrix resin composition layer is formed on a rotating roll and transferred to a tow, a "paper transfer method" in which a matrix resin layer is formed on paper and transferred to a tow, a "nozzle dropping method" described in JP 09-176346 A, JP 2005-335296 A, JP 2006-063173 A, and the like, and a "resin contact and tow moving method" described in JP 08-073630 A, JP 09-031219 A, and the like.

Among these, the rotating roll method and the resin contact and tow moving method are preferable from the viewpoint of controlling the supply amount of the matrix resin composition and of being easily conducted. In addition, the width of the reinforcing fiber bundle is usually not stabilized, and the spreading direction thereof fluctuates. Hence, it is effective to narrow and stabilize the tow width immediately before or at the time of contact with the matrix resin composition after the reinforcing fiber bundle is widened as described in JP 08-073630 A. As a specific example, there is a method in which the width of the reinforcing fiber bundle is narrowed by providing a groove having a predetermined width at a resin discharge port, a coated portion, or a position immediately before this and allowing the reinforcing fiber to run in the groove.

Impregnation of the reinforcing fiber bundle with the matrix resin composition can be conducted by a known method. Among these, a method in which the reinforcing fiber bundle is scraped on a heating body such as a heating roll or a hot plate, a method in which the reinforcing fiber bundle to which the matrix resin composition is supplied is allowed to run in the heating furnace, namely, in the heated atmosphere, and a method in which the reinforcing fiber bundle is heated using a non-contact heating means such as infrared heating are preferable. It is still more preferable to heat the reinforcing fiber bundle using a non-contact heating means so that the temperatures of the reinforcing fiber bundle and the matrix resin composition do not decrease during the period from the matrix resin composition is supplied to the reinforcing fiber bundle until the matrix resin composition is heated using a heating body and between the heating body and the heating body.

In addition, in the step of impregnating the reinforcing fiber bundle with the matrix resin composition, it is preferable to change the cross-sectional shape of the reinforcing fiber bundle by applying an external force to the reinforcing fiber bundle and thus laterally moving the filament constituting the reinforcing fiber bundle on the roll surface. By such an operation, it is possible to change the relative positions of the filaments and thus to increase the contact opportunity between the matrix resin composition and the filament. As a result, it is possible to obtain a uniform impregnation effect which exceeds the impregnation effect simply by pressing or a capillary phenomenon.

Specific examples of the operation to change the relative positions of filaments may include folding the reinforcing fiber bundle, widening the reinforcing fiber bundle, narrowing the reinforcing fiber bundle, or twisting the reinforcing fiber bundle. In these operations, the folding operation and the twisting operation tend to narrow the width of the reinforcing fiber bundle in the same manner as the narrowing operation. The uniform impregnation effect further increases when an operation having the action of narrowing the width of the reinforcing fiber bundle is concurrently used with an operation to widen the width of the reinforcing fiber bundle. Incidentally, twisting may be conducted at the time of impregnation of the matrix resin composition, and untwisting may be conducted after impregnation in a case in which the reinforcing fiber bundle is required to be in an untwisted state after impregnation. In addition, when scraping is added at the same time as or immediately after twisting, the width of the reinforcing fiber bundle tends to widen and the matrix resin composition further moves in the thickness direction of the reinforcing fiber bundle, thus the uniformity of impregnation increases.

When laterally moving the filament on the roll surface, it is useful to bring the reinforcing fiber bundle into contact with the roll rotating at a peripheral speed slower than the running speed of the reinforcing fiber bundle and to scrape the reinforcing fiber bundle from the viewpoint of preventing fluff accumulation and cleaning the roll. When the reinforcing fiber bundle is scraped, the reinforcing fiber bundle is not entangled on the roll surface and the roll is rubbed with the reinforcing fiber bundle and is rotating, thus the surface in contact with the reinforcing fiber bundle is always in a state of being cleaned. However, the peripheral speed of the roll is preferably 50% or more and 99% or less and more preferably 80% or more and 95% or less of the running speed of the reinforcing fiber bundle. When the peripheral speed of the roll with respect to the running speed of the reinforcing fiber bundle is equal to or faster than the lower limit value, it is possible to suppress fluffing of the reinforcing fiber bundle due to strong scraping, to suppress occurrence of twining in a later step or occurrence of a problem when unwinding the tow prepreg wound onto the bobbin.

It is preferable that the reinforcing fiber bundle uniformly impregnated with the matrix resin composition is cooled to about room temperature until to be subjected to the step of winding the reinforcing fiber bundle onto a bobbin such as a paper tube. When the reinforcing fiber bundle is wound onto a bobbin such as a paper tube in a state of not being sufficiently cooled, there is a case in which the winding form is disturbed as slipping occurs during winding since the matrix resin composition has a low viscosity or the shelf life of tow prepreg is shortened as a high temperature state of the tow prepreg layer wound onto the bobbin continues for a relatively long time. Cooling of the reinforcing fiber bundle can be conducted using known cooling means such as scraping against a cooling body or a non-contact cooling means.

[Composite Material-Reinforced Pressure Vessel]

The composite material-reinforced pressure vessel of the present invention is a composite material-reinforced pressure vessel including a metal liner or a resin liner and a composite material reinforcing layer disposed so as to cover a part or the whole of the surface of the metal liner or the resin liner, and the composite material reinforcing layer is a cured product of the tow prepreg of the present invention.

In other words, the composite material-reinforced pressure vessel of the present invention is a composite material-reinforced pressure vessel in which a cured product of the tow prepreg of the present invention is wound onto a liner such as a metal liner or a resin liner as a composite material reinforcing layer.

[Method of Producing Composite Material-Reinforced Pressure Vessel]

The method of producing a composite material-reinforced pressure vessel of the present invention includes a FW step of winding the tow prepreg of the present invention or the resin-impregnated reinforcing fiber bundle manufactured in the step (3) described above onto a liner to form a pressure vessel intermediate body, and a curing step of heating the pressure vessel intermediate body obtained through the FW step to cure the matrix resin composition contained in the tow prepreg or the resin-impregnated reinforcing fiber bundle.

[FW Step]

The FW step is a step of winding the tow prepreg of the present invention or the resin-impregnated reinforcing fiber bundle manufactured in the step (3) described above onto a liner to form a pressure vessel intermediate body.

The tow prepreg or resin-impregnated reinforcing fiber bundle is preferably wound onto a rotating liner. The liner is preferably a metal liner or a resin liner.

As the filament winding machine (FW machine), conventionally known ones can be used. In the case of fabricating a composite material-reinforced pressure vessel, a tow prepreg or a resin-impregnated reinforcing fiber bundle is wound onto the liner as a mandrel. The FW machine may be one which winds one tow prepreg or resin-impregnated reinforcing fiber bundle onto the mandrel or one which winds a plurality of tow prepregs or resin-impregnated reinforcing fiber bundles onto a mandrel at the same time.

When winding the tow prepreg or the resin-impregnated reinforcing fiber bundle on the liner, it is preferable to wind the tow prepreg or the resin-impregnated reinforcing fiber bundle so as to have a structure in which composite materials having different properties are laminated in order to make full use of the properties of the reinforcing fiber as an anisotropic material. One obtained by curing a layer composed of the tow prepreg or the resin-impregnated reinforcing fiber bundle is a composite material reinforcing layer (hereinafter also simply referred to as a "reinforcing layer").

The structure and thickness of the reinforcing layer and the angle at which the tow prepreg or the resin-impregnated reinforcing fiber bundle is wound onto the liner can be freely selected according to the uses and shape of the vessel, pressure resistant performance required for the vessel, and the like.

Hoop winding and helical winding are known as a method of winding a tow prepreg or a resin-impregnated reinforcing fiber bundle, and the method can be freely selected according to the uses and shape of the vessel, pressure resistant performance required for the vessel, and the like. Commonly, the reinforcing layer which reinforces the mirror portion and the trunk portion is referred to as a "helical layer" and the reinforcing layer which reinforces the trunk portion is referred to as a "hoop layer".

[Curing Step]

The curing step is a step of heating the pressure vessel intermediate body obtained through the FW step to cure the matrix resin composition contained in the tow prepreg or the resin-impregnated reinforcing fiber bundle. The reinforcing layer is formed as the tow prepreg or the resin-impregnated reinforcing fiber bundle is cured.

The curing temperature, the curing time, the rate of temperature rise, and the rate of temperature decrease are determined according to the composition of the matrix resin composition blended, but the tow prepreg of the present invention or the resin-impregnated reinforcing fiber bundle is preferably heated at a temperature of from 80° C. to 150° C. for from 1 to 10 hours. Incidentally, considering the case of using a plastic liner, the temperature range is more preferably set to from 80° C. to 120° C., and the tow prepreg of the present invention or the resin-impregnated reinforcing fiber bundle can be sufficiently cured even in this temperature range. The heating condition may be one stage or multistage heating conducted under a plurality of heating conditions combined. Particularly in the case of a composite material-reinforced pressure vessel which has a relatively thick reinforcing layer so as to be filled with hydrogen gas to be used in a fuel cell and a case in which curing is conducted at a high temperature (100° C. or higher) and for a short time (shorter than 2 hours), it is preferable to cure the matrix resin composition by multistage heating conducted under a plurality of heating conditions combined.

By providing the curing time at a lower temperature (lower than 100° C.) before heating at a higher temperature, it is possible to prevent the occurrence of troubles such as burning of the interior of the reinforcing layer due to an abrupt exothermic reaction of the matrix resin composition.

As the heating method, a method using a vacuum bag and a heater, a method in which a heat shrinkable tape is wound onto the pressure vessel intermediate body and the pressure vessel intermediate body wound is heated in an oven to conduct heating and pressing at the same time, a method in which a pressing substance is filled inside the liner and the pressure vessel intermediate body is heated while applying an internal pressure thereto, and the like are used, these can also be combined according to the curing conditions.

Incidentally, the composite material-reinforced pressure vessel of the present invention can also be fabricated using the resin-impregnated reinforcing fiber bundle described above by a so-called wet filament winding method.

[Other Uses]

The tow prepreg of the present invention can also be suitably used in things other than the composite material-reinforced pressure vessel. For example, a composite tubular body obtained by winding the tow prepreg onto an elongated mandrel by the FW method and curing the tow prepreg has a high crush strength and can be suitably used in the uses required to have a torsional strength and a bending strength such as a golf shaft, a fishing rod, and a drive shaft.

EXAMPLES

Hereinafter, the present invention will be specifically described with reference to Examples, but the present invention is not limited to these Examples.

The raw materials of the resin compositions used in the respective examples, the preparation methods, and the measurement methods of the respective physical properties are presented below. The numerical value of each component in the table represents the number of mass parts of each component to be blended in the matrix resin composition.

<Raw Materials>

(Component (A1))

jER 828

"Product name" jER 828, "component" bisphenol A type epoxy resin (liquid bifunctional epoxy resin) (epoxy equivalent: 189 g/eq), "supplier" Mitsubishi Chemical Corporation jER 1001

"Product name" jER 1001, "component" bisphenol A type epoxy resin (solid bifunctional epoxy resin) (epoxy equivalent: 475 g/eq), "supplier" Mitsubishi Chemical Corporation (Component (A2))

CY-184

"Product name" Araldite CY 184, "component" hexahydrophthalic acid diglycidyl ester (epoxy equivalent: 158 g/eq), "supplier" Huntsman Corporation (Component (A) Other than Components (A1) and (A2))

N-775

"Product name" N-775, "component" phenol novolak type epoxy resin (epoxy equivalent: 187 g/eq), "supplier" DIC Corporation Preliminarily Reacted Epoxy Resin One obtained by mixing jER 828 and SEIKACURE-S (4,4'-diaminodiphenyl sulfone manufactured by SEIKA CORPORATION) at 100:9 (unit:parts by mass), heating the mixture at 150° C., and preliminarily reacting the heated mixture so as to have a viscosity of 9 Pa·s measured at 90° C. using a B type viscometer (Mixture of Component (A) and Component (D))

MX-257

"Product name" KANE ACE MX-257, "component" 63% by mass of bisphenol A type epoxy resin (bifunctional epoxy resin, epoxy equivalent: 189 g/eq) and 37% by mass of butadiene-based core-shell type rubber particles (volume average particle diameter: 200 nm), "supplier" KANEKA CORPORATION

MX-154

"Product name" KANE ACE MX-154, "component" 60% by mass of bisphenol A type epoxy resin (bifunctional epoxy resin, epoxy equivalent: 189 g/eq) and 40% by mass of butadiene-based core-shell type rubber particles (volume average particle diameter: 100 nm), "supplier" KANEKA CORPORATION

MX-125

"Product name" KANE ACE MX-125, "component" 75% by mass of bisphenol A type epoxy resin (bifunctional epoxy resin, epoxy equivalent: 189 g/eq) and 25% by mass of butadiene-based core-shell type rubber particles (volume average particle diameter: 100 nm), "supplier" KANEKA CORPORATION (Component (B))

DICY

"Product name" jER Cure DICY7, "component" dicyandiamide, "supplier" Mitsubishi Chemical Corporation (Component (C))

Omicure 94

"Product name" Omicure 94, "component" 3-phenyl-1,1-dimethylurea, "supplier" PTI Japan Corporation Omicure 52

"Product name" Omicure 52, "component" 4,4'-methylenebis(phenyldimethylurea), "supplier" PTI Japan Corporation Omicure 24

"Product name" Omicure 24, "component" 2,4-toluenebis (3,3-dimethylurea), "supplier" PTI Japan Corporation

DCMU 99

"Product name" DCMU 99, "component" 3-(3,4-dichlorophenyl)-1,1-dimethylurea, "supplier" Hodogaya Chemical Co., Ltd.

2 MZA-PW

"Product name" CUREZOL 2MZA-PW, "component" 2,4-diamino-6-[2-(2-methyl-1-imidazolyl)ethyl]-1,3,5-triazine, "supplier" SHIKOKU CHEMICALS CORPORATION

2PZCNS-PW

"Product name" CUREZOL 2PZCNS-PW, "component" 1-cyanoethyl-2-phenylimidazolium trimellitate, "supplier" SHIKOKU CHEMICALS CORPORATION (Epoxy Resin Curing Agent Other than Component (B))

DY 9577

"Product name" ACCELERATOR DY 9577 ES, "component" boron trichloride-amine complex, "supplier" Huntsman Corporation

PN-40

"Product name" AJICURE PN-40, "component" imidazole adduct, "supplier" Ajinomoto Fine-Techno Co., Inc.

MY-H

"Product name" AJICUR MY-H, "component" tertiary amine adduct, "supplier" Ajinomoto Fine-Techno Co., Inc.

(Arbitrary Component)

BYK-A 506

"Product name" BYK-A 506, "component" 1% by mass of fluorine-modified polysiloxane and 99% by mass of cyclohexanone, "supplier" BYK <Evaluation and Evaluating Method>

(Curing-Completed Time of Matrix Resin Composition)

The curing-completed time at 100° C. was measured in conformity to JIS K6300 under the following conditions. Incidentally, the curing-completed time was defined as the time required until the inclination of the tangential line to the torque-time curve became 1/30 of the maximum value after the inclination became the maximum value. In the table, it is denoted as "curing-completed time".

Measuring instrument: CURELASTOMETER 7 Type P manufactured by JSR Trading Co., Ltd.

Frequency of vibrations: 100 cpm
Angle of amplitude of vibrations: ±1l/4°
Dice shape: WP-100

(Viscosity of Matrix Resin Composition)

The viscosity of the matrix resin composition was measured as follows. In the table, the viscosity at 30° C. is denoted as "viscosity at 30° C." and the minimum viscosity to be obtained when the viscosity is measured by raising the temperature from room temperature to 130° C. of the curing temperature is denoted as "viscosity A".

Apparatus: AR-G2 (manufactured by TA Instruments)
Used plate: 35 mm φ parallel plate
Plate gap: 0.5 mm
Frequency of vibrations measured: 10 rad/sec
Rate of temperature rise: 2° C./min
Stress: 300 Pa (Tack of Tow Prepreg)

The tack test to be described below was conducted and the average maximum stress value thus obtained was taken as the tack of tow prepreg. In the table, it is denoted as "AMS value".

Apparatus: Tack Tester TA-500 (manufactured by UBM)
Contact area of plunger with sample: about 3.1 cm$^2$
Plunger pushing time: 10 seconds
Plunger pushing pressure: 90,000 Pa
Plunger lifting speed: 1 mm/sec
Temperature of measurement environment: 23° C.
Humidity of measurement environment: 50% RH
Procedure:

1) The tow prepreg is fixed on the sample stage. At this time, the surface of the tow prepreg to be in contact with the plunger is set to be the inside surface (namely, the surface on the paper tube side) when the tow prepreg is wound onto the paper tube.

2) The plunger is pushed against the tow prepreg for 10 seconds by applying a load of 90,000 Pa.

3) The plunger is lifted at 1 mm/sec.

4) The maximum value of the stress value while lifting the plunger is taken as the maximum stress value, the measurement is conducted three times in total, and the average value of the maximum stress values thus obtained is taken as the average maximum stress value.

(Unwinding Property, Shape Retaining Property, and Process Passing Property of Tow Prepreg)

The unwinding property, shape retaining property, and process passing property of tow prepreg when producing the composite material-reinforced pressure vessel were evaluated by the following methods. It was evaluated as "A" in a case in which it was possible to manufacture a composite material-reinforced pressure vessel without any problem in any property, "B" in a case in which it was possible to manufacture a composite material-reinforced pressure vessel approximately stably although there was a little problem, and "C" in a case in which there was an obvious problem in any property. In the table, it is denoted as "evaluation T".

Incidentally, the phrase "there is a problem in unwinding property" means a state in which ringer does not occur when unwinding the tow prepreg wound onto the bobbin in the FW step, that is, the single yarn of the reinforcing fiber bundle of the tow prepreg is entangled by the stickiness of the matrix resin composition on the surface of the tow prepreg of the lower layer and thus cannot be successfully unwound, the phrase "there is a problem in shape retaining property" means a state in which the tape-like tow prepreg is folded to form a thin string while the step proceeds and thus the winding is greatly disturbed when the tape-like tow prepreg is wound onto the mandrel or a large space is formed between the wound tow prepregs in the FW step, and the phrase "there is a problem in process passing property" means a state in which the single yarn of the reinforcing fiber bundle of the tow prepreg is entangled by the matrix resin composition attached to the roll surface when the tow prepreg is scraped on and passes through each roll in the FW step and thus the step cannot proceed because of the twining.

(Burst Pressure of Composite Material-Reinforced Pressure Vessel)

A composite material-reinforced pressure vessel was set in a hydraulic fracture testing machine, the pressure vessel was filled with water, a hydraulic pressure was then applied to the composite material-reinforced pressure vessel at a rate of pressure increase of 15 MPa/min, and the hydraulic pressure when the composite material-reinforced pressure vessel fractured was taken as the burst pressure of the composite material-reinforced pressure vessel. In the table, it is denoted as "burst pressure".

(Appearance of Composite Material-Reinforced Pressure Vessel)

The composite material-reinforced pressure vessel was visually observed, and it was evaluated as "C" in a case in which resin flow did not almost occur or resin flow occurred in a significantly large amount and the cured matrix resin composition was hardly present on the surface layer and between the reinforcing fiber bundles, "B" in a case in which a small amount of the cured matrix resin composition was present on the surface layer and between the reinforcing fiber bundles, and "A" in a case in which resin flow occurred in a proper amount and the cured matrix resin composition was appropriately present on the surface layer and between the reinforcing fiber bundles. In the table, it is denoted as "appearance".

(Void in Composite Material-Reinforced Pressure Vessel)

A part of the composite material-reinforced pressure vessel was cut out so as to include the fiber-reinforced composite material layer portion corresponding to Laminate No. 1 described in the following Table 1, and the cross section thereof was observed. Before observing the cross section, the observation surface of the fiber-reinforced composite material layer portion thus cut was polished using REFINE-POLISHER APM-122 (manufactured by Refine Tec Ltd.). For the observation of cross section, an industrial microscope ECLIPSE LV100ND (manufactured by Nikon Corporation) was used, the fiber-reinforced composite material layer portion corresponding to Laminate No. 1 was enlarged by 200-fold, a cross-sectional photograph thereof was obtained, the void portion was cut out from the cross-sectional photograph, and the void fraction was calculated from the mass by the following equation.

(Void fraction)=(mass of void portion)÷(mass of fiber-reinforced composite material portion in cross-sectional photograph)×100

It was evaluated as "C" in a case in which the void fraction was greater than 2%, "B" in a case in which the void fraction was from 1.5 to 3%, and "A" in a case in which the void fraction was 1.5% or less. In the table, it is denoted as "void".

Example 1

(Preparation of Matrix Resin Composition)

A matrix resin composition containing the respective components described in the table at the proportion described in the table was prepared as follows.

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 70 parts by mass of MX-257, 25 parts by mass of CY-184, and 0.3 part by mass of BYK A506 were weighed and added, and the mixture was stirred until to be uniform while heating the substances in the glass flask at from 40° C. to 50° C. using an oil bath, thereby obtaining a matrix resin composition (1).

(Fabrication of Tow Prepreg)

A tow prepreg was fabricated using a carbon fiber "37-800 WD" having 30,000 filaments (manufactured by Mitsubishi Chemical Carbon Fiber and Composites Inc., tensile strength: 5520 MPa, tensile modulus of elasticity: 255 GPa) as a reinforcing fiber bundle and the matrix resin composition (1) manufactured above as a matrix resin. The specific fabrication method is described below.

The reinforcing fiber bundle was sent out from the creel, allowed to pass through an opening bar heated to have a surface temperature of about 100° C., and widened to have a width of from 10 to 15 mm. The reinforcing fiber bundle thus widened was brought into contact with a touch roll coated with the matrix resin composition heated to about 40° C. to supply the matrix resin composition to the reinforcing fiber bundle. The reinforcing fiber bundle to which the matrix resin composition was supplied was scraped on an impregnating roll heated to about 80° C. to impregnate the matrix resin composition into the interior of the reinforcing fiber bundle, and then the impregnated reinforcing fiber bundle was wound onto a paper tube using a winder, thereby fabricating a tow prepreg (1). Incidentally, the amount of the resin attached to the reinforcing fiber bundle, namely, the resin content rate in the tow prepreg was adjusted by adjusting the clearance between the doctor blade and the touch roll.

(Manufacture of Composite Material-Reinforced Pressure Vessel)

The tow prepreg (1) manufactured above was wound onto an aluminum liner having a capacity of 9 liters (total length: 540 nm, length of trunk portion: 415 mm, outer diameter of trunk portion: 163 mm, wall thickness at center of trunk portion: 3 mm) using a FW apparatus. The aluminum liner used was formed of a material fabricated by subjecting an aluminum material prescribed in A6061-T6 of JIS H4040 to a heat treatment.

The tow prepreg was unwound from the paper tube, subjected to the position adjustment via a guide roll, and then wound onto the liner as follows.

First, as a first layer in contact with the trunk portion of the liner, a tow prepreg was wound onto the trunk portion so as to be at 88.6° with respect to the rotational axis direction of the liner (Laminate No. 1). Thereafter, the tow prepreg was wound thereonto at an angle of 11.0° with respect to the rotational axis direction of the liner (Laminate No. 2), a helical layer for reinforcing the mirror portion of the liner was laminated, and subsequently, the tow prepreg was sequentially wound onto the liner at the angles and layer thicknesses described in Laminate No. 3 to Laminate No. 8 presented in Table 1, thereby fabricating a pressure vessel intermediate body (1).

TABLE 1

|  | Winding angle (°) | Layer thickness (mm) |
| --- | --- | --- |
| Laminate No. 1 | 88.6 | 2.03 |
| Laminate No. 2 | 11 | 0.58 |
| Laminate No. 3 | 11 | 0.58 |
| Laminate No. 4 | 65 | 0.57 |
| Laminate No. 5 | 13 | 0.6 |
| Laminate No. 6 | 13 | 0.6 |
| Laminate No. 7 | 88.6 | 0.72 |
| Laminate No. 8 | 11 | 0.62 |

The pressure vessel intermediate body (1) manufactured above was removed from the FW apparatus, suspended in a heating furnace, the temperature inside the furnace was raised to 130° C. at 2° C./min, and the pressure vessel intermediate body (1) was then held at 130° C. for 2 hours for curing. Thereafter, the temperature inside the furnace was cooled to 60° C. at 1° C./min, thereby obtaining a composite material-reinforced pressure vessel (1).

The matrix resin composition (1), the tow prepreg (1), and the composite material-reinforced pressure vessel (1) thus obtained were subjected to the evaluation described above, respectively. The results are presented in the table.

Examples 2 to 13 and Comparative Examples 1 to 7

As Examples 2 to 13 and Comparative Examples 1 to 7, matrix resin compositions containing the respective components presented in the table at the proportion described in the table were prepared, and tow prepregs, pressure vessel intermediate bodies, and composite material-reinforced pressure vessels were manufactured using the matrix resin compositions thus obtained.

The matrix resin compositions, the tow prepregs, and the composite material-reinforced pressure vessels thus obtained were subjected to the same evaluation as in Example 1.

Figure 3:
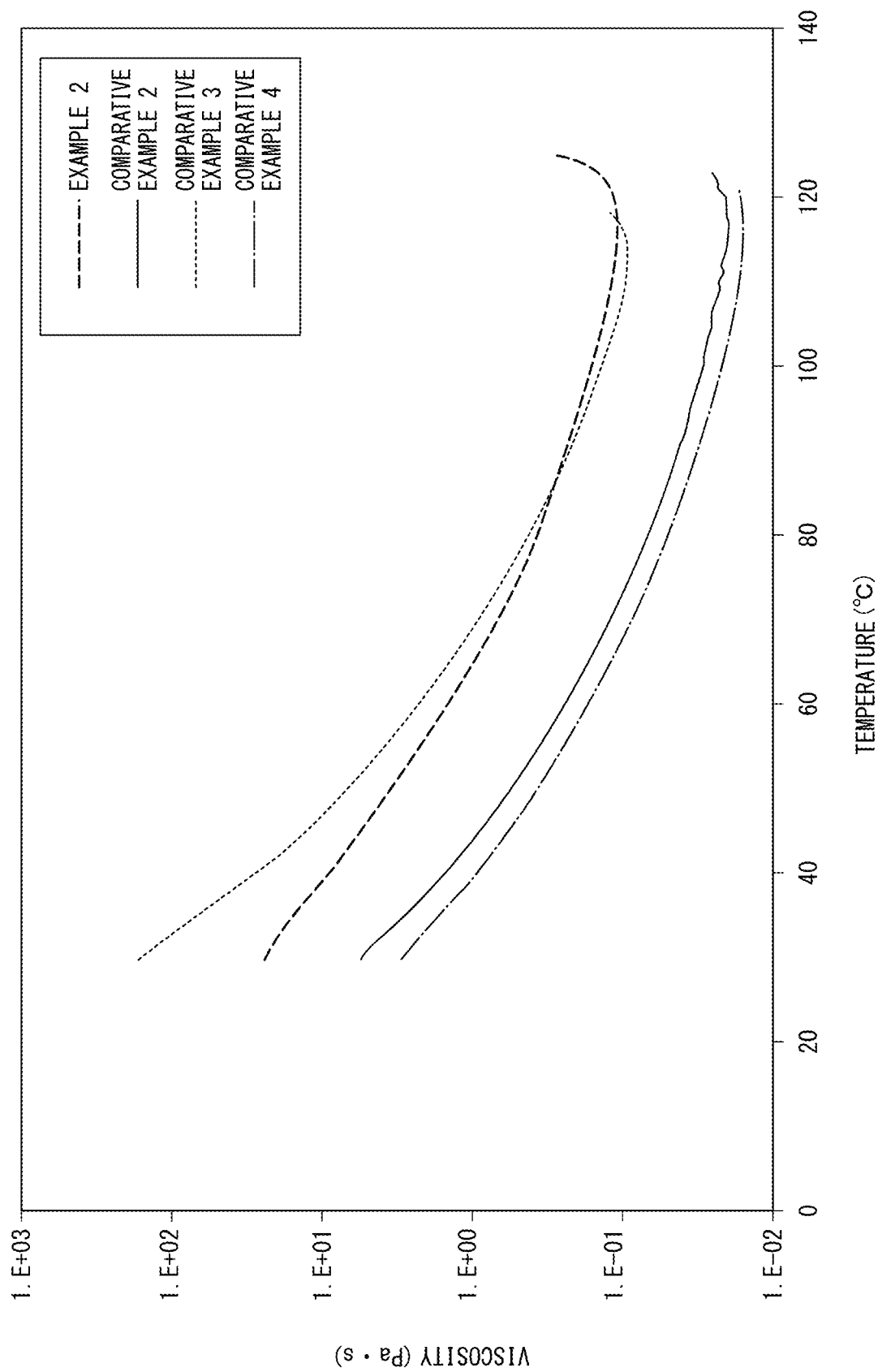
FIG. 3 is a graph illustrating the measurement results on the temperature-programmed viscosity of Example 2, Comparative Example 2, Comparative Example 3, and Comparative Example 4.

In addition, the measurement results on the viscosity of matrix resin composition in Example 2, Comparative Example 2, Comparative Example 3, and Comparative Example 4 are illustrated in FIG. 3. In Comparative Example 3 in which the viscosity A of the matrix resin composition was adjusted using a solid epoxy resin, the viscosity at 30° C. was a high viscosity, but in the case of using an epoxy resin containing the component (D), it was possible to maintain the viscosity at 30° C. in a proper range even when the viscosity A of the matrix resin composition was adjusted.

Incidentally, the matrix resin composition, the tow prepreg, the pressure vessel intermediate body, and the composite material-reinforced pressure vessel in each example were manufactured as follows, specifically.

Example 2

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 70 parts by mass of MX-257, 25 parts by mass of jER 828, and 0.3 part by mass of BYK A506 were weighed and added, and the mixture was stirred until to be uniform while heating the substances in the glass flask at from 40° C. to 50° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Example 3

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 50 parts by mass of MX-257, 45 parts by mass of jER 828, and 0.3 part by mass of BYK A506 were weighed and added, and the mixture was stirred until to be uniform while heating the substances in the glass flask at from 40° C. to 50° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Example 4

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 50 parts by mass of MX-257, 20 parts by mass of jER 828, 25 parts by mass of CY-184, and 0.3 part by mass of BYK A506 were weighed and added, and the mixture was stirred until to be uniform while heating the substances in the glass flask at from 40° C. to 50° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

The cross-sectional photograph of the fiber-reinforced composite material layer portion corresponding to Laminate NO. 1 of the composite material-reinforced pressure vessel obtained in Example 4 is illustrated in FIG. 1.

Example 5

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 20 parts by mass of jER 1001, 25 parts by mass of CY-184, and 50 parts by mass of MX-257 were weighed and added, the mixture was stirred until to be uniform while heating the substances in the glass flask at from 90° C. to 120° C. using an oil bath, and the glass flask was then taken out from the oil bath and left to cool until the temperature of the substances reached 60° C. or lower. To this, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), and 0.3 part by mass of BYK A506 were weighed and added, and the mixture was stirred until to be uniform while heating the substances in the glass flask at from 55° C. to 65° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Example 6

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 18 parts by mass of jER 828, 50 parts by mass of MX-257, and 25 parts by mass of CY-184 were weighed and added, the mixture was stirred until to be uniform while heating the substances in the glass flask at from 40° C. to 60° C. using an oil bath, further 10 parts by mass of the master batch of jER 828 and DICY (containing 5 parts by mass of jER 828 and 5 parts by mass of DICY) and 4 parts by mass of the master batch of jER 828 and Omicure 94 (containing 2 parts by mass of jER 828 and 2 parts by mass of Omicure 94) were weighed and added thereto, and the mixture was stirred until to be uniform while heating the substances in the glass flask at from 40° C. to 60° C. using an oil bath, thereby obtaining matrix resin composition.

A tow prepreg and a pressure vessel intermediate body were manufactured using the matrix resin composition thus obtained in the same manner as in Example 1. A composite material-reinforced pressure vessel was manufactured in the same manner as in Example 1 except that the pressure vessel intermediate body thus obtained was removed from the FW apparatus, suspended in a heating furnace, the temperature inside the furnace was raised to 100° C. at 1° C./min, and the pressure vessel intermediate body was then held at 100° C. for 6 hours for curing.

Example 7

A matrix resin composition, a tow prepreg, a pressure vessel intermediate body, and a composite material-reinforced pressure vessel were manufactured in the same manner as in Example 6 except that the composition of the matrix resin composition was set as presented in the table.

Example 8

A matrix resin composition, a tow prepreg, a pressure vessel intermediate body, and a composite material-reinforced pressure vessel were manufactured in the same manner as in Example 1 except that the composition of the matrix resin composition was set as presented in the table and a master batch prepared by kneading jER 828 and 2MZA-PW at a proportion of 1:1 in mass ratio was used.

Example 9

A matrix resin composition, a tow prepreg, a pressure vessel intermediate body, and a composite material-reinforced pressure vessel were manufactured in the same manner as in Example 1 except that the composition of the matrix resin composition was set as presented in the table and a master batch prepared by kneading jER 828 and 2MZA-PW at a proportion of 1:1 in mass ratio was used.

Example 10

A matrix resin composition, a tow prepreg, a pressure vessel intermediate body, and a composite material-reinforced pressure vessel were manufactured in the same manner as in Example 1 except that the composition of the matrix resin composition was set as presented in Table 3 and a master batch prepared by kneading jER 828 and 2PZCNS-PW at a proportion of 1:1 in mass ratio was used.

Example 11

A matrix resin composition, a tow prepreg, a pressure vessel intermediate body, and a composite material-reinforced pressure vessel were manufactured in the same manner as in Example 1 except that the composition of the matrix resin composition was set as presented in the table and a master batch prepared by kneading jER 828 and Omicure 52 at a proportion of 1:1 in mass ratio was used.

Example 12

A matrix resin composition, a tow prepreg, a pressure vessel intermediate body, and a composite material-reinforced pressure vessel were manufactured in the same manner as in Example 6 except that the composition of the matrix resin composition was set as presented in the table and a master batch prepared by kneading jER 828 and Omicure 24 at a proportion of 1:1 in mass ratio was used.

Example 13

A matrix resin composition, a tow prepreg, a pressure vessel intermediate body, and a composite material-reinforced pressure vessel were manufactured in the same manner as in Example 1 except that the composition of the matrix resin composition was set as presented in the table and a master batch prepared by kneading jER 828 and DCMU99 at a proportion of 1:1 in mass ratio was used.

Comparative Example 1

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 30 parts by mass of MX-257, 65 parts by mass of jER 828, and 0.3 part by mass of BYK A506 were weighed and added, and the mixture was stirred until to be uniform while heating the substances in the glass flask at from 40° C. to 50° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Comparative Example 2

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 8 parts by mass of the master batch of jER 828 and DICY (containing 4 parts by mass of jER 828 and 4 parts by mass of DICY), 2 parts by mass of the master batch of jER 828 and Omicure 94 (containing 1 part by mass of jER 828 and 1 part by mass of Omicure 94), 10 parts by mass of MX-257, 85 parts by mass of jER 828, and 0.3 part by mass of BYK A506 were weighed and added, and the mixture was stirred until to be uniform while heating the substances in the glass flask at from 40° C. to 50° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Comparative Example 3

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 32 parts by mass of N-775 and 62 parts by mass of jER 828 were weighed and added, the mixture was stirred until to be uniform while heating the substances in the glass flask at from 90° C. to 120° C. using an oil bath, and the glass flask was then taken out from the oil bath and left to cool until the temperature of the substances reached 60° C. or lower. To this, 9.6 parts by mass of the master batch of jER 828 and DICY (containing 4.8 parts by mass of jER 828 and 4.8 parts by mass of DICY), 2.4 parts by mass of the master batch of jER 828 and Omicure 94 (containing 1.2 part by mass of jER 828 and 1.2 part by mass of Omicure 94), and 0.3 part by mass of BYK A506 were weighed and added, and the mixture was stirred until to be uniform while heating the substances in the glass flask at from 55° C. to 65° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Figure 2:
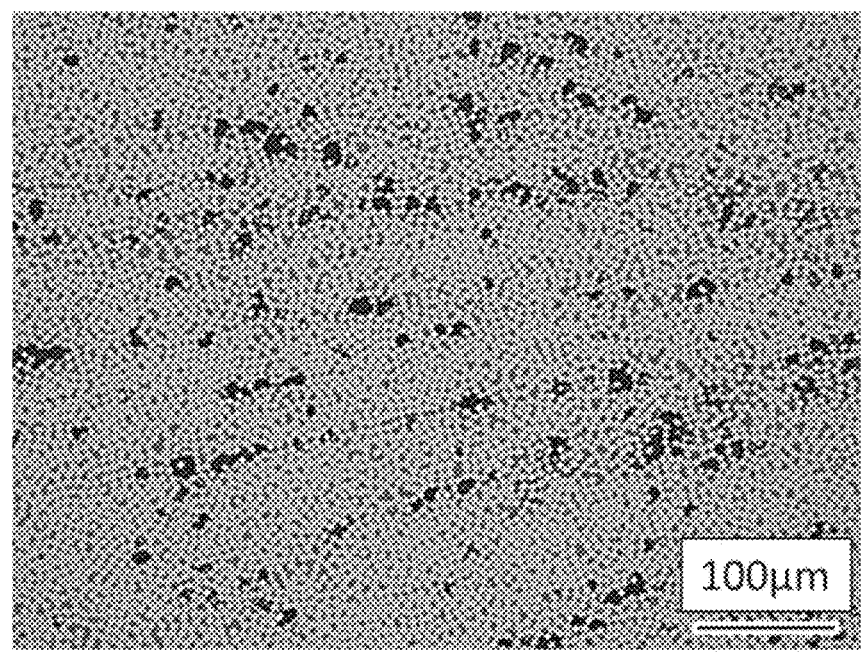
FIG. 2 is a cross-sectional photograph of the fiber-reinforced composite material layer portion corresponding to Laminate No. 1 of the composite material-reinforced pressure vessel obtained in Comparative Example 3.

The cross-sectional photograph of the fiber-reinforced composite material layer portion corresponding to Laminate NO. 1 of the composite material-reinforced pressure vessel obtained in Comparative Example 3 is illustrated in FIG. 2.

Comparative Example 4

A master batch was prepared by mixing jER 828 and DICY at a proportion of 1:1 in mass ratio and kneading the mixture using a triple roll mill. Subsequently, a master batch was prepared by mixing jER 828 and Omicure 94 at a proportion of 1:1 in mass ratio and further kneading the mixture using a triple roll mill.

To a glass flask, 25 parts by mass of N-775 and 69 parts by mass of jER 828 were weighed and added, the mixture was stirred until to be uniform while heating the substances in the glass flask at from 90° C. to 120° C. using an oil bath, and the glass flask was then taken out from the oil bath and left to cool until the temperature of the substances reached 60° C. or lower. To this, 9.6 parts by mass of the master batch of jER 828 and DICY (containing 4.8 parts by mass of jER 828 and 4.8 parts by mass of DICY), 2.4 parts by mass of the master batch of jER 828 and Omicure 94 (containing 1.2 part by mass of jER 828 and 1.2 part by mass of Omicure 94), and 0.3 part by mass of BYK A506 were weighed and added, and the mixture was stirred until to be uniform while heating the substances in the glass flask at from 55° C. to 65° C. using an oil bath, thereby obtaining matrix resin composition.

A tow prepreg, a pressure vessel intermediate body, and a composite material-reinforced pressure vessel were manufactured by the same method as in Example 1 using the matrix resin composition thus obtained.

Comparative Example 5

To a glass flask, 100 parts by mass of jER 828, 10 parts by mass of DY9577, and 0.3 part by mass of BYK A506 were weighed and added, and the mixture was stirred until to be uniform while heating the substances in the glass flask at from 50° C. to 60° C. using an oil bath, thereby obtaining a matrix resin composition.

A tow prepreg, a pressure vessel intermediate body, and a composite material-reinforced pressure vessel were manufactured by the same method as in Example 1 using the matrix resin composition thus obtained.

Comparative Example 6

A matrix resin composition, a tow prepreg, a pressure vessel intermediate body, and a composite material-reinforced pressure vessel were manufactured in the same manner as in Example 6 except that the composition of the matrix resin composition was set as presented in the table, the substances other than the master batches were weighed before weighing the master batches and stirred at 80° C. until the preliminarily reacted epoxy resin was uniformly melted, and the master batches were then added thereto.

Comparative Example 7

A matrix resin composition, a tow prepreg, a pressure vessel intermediate body, and a composite material-reinforced pressure vessel were manufactured in the same manner as in Example 6 except that the composition of the matrix resin composition was set as presented in the table, the substances other than the master batches were weighed before weighing the master batches and stirred at 110° C. until N-775 was uniformly melted, and the master batches were then added thereto.

TABLE 2

| | | | Example | | | | | |
|---|---|---|---|---|---|---|---|---|
| | | | 1 | 2 | 3 | 4 | 5 | 6 |
| Component (A) | Component (A1) | jER828 | 5 | 30 | 50 | 25 | 5 | 25 |
| | | jER1001 | | | | | 20 | |
| | Component (A2) | CY-184 | 25 | | | 25 | 25 | 25 |
| | Component (A) other than components (A1) and (A2) | N-775 | | | | | | |
| | | Preliminarily reacted epoxy resin | | | | | | |
| Mixture of component (A) and component (D) | | MX-257 | 70 | 70 | 50 | 50 | 50 | 50 |
| | | MX-154 | | | | | | |
| | | MX-125 | | | | | | |
| Component (B) | | DICY | 4 | 4 | 4 | 4 | 4 | 5 |
| Component (C) | | Omicure 94 | 1 | 1 | 1 | 1 | 1 | 2 |
| | | Omicure 52 | | | | | | |
| | | Omicure 24 | | | | | | |
| | | DCMU99 | | | | | | |
| | | 2MZA-PW | | | | | | |
| | | 2PZCNS-PW | | | | | | |
| Epoxy resin curing agent other than component (B) | | DY9577 | | | | | | |
| | | PN-40 | | | | | | |
| | | MY-II | | | | | | |
| Arbitrary component | | BYK A506 | 0.3 | 0.3 | 0.3 | 0.3 | 0.3 | 0.3 |
| Sum of component (A1-1) | | (parts by mass) | 49.1 | 74.1 | 81.5 | 56.5 | 36.5 | 56.5 |
| Amount of component (D) blended (to 100 parts by mass of component (A)) | | (parts by mass) | 35.0 | 35.0 | 22.7 | 22.7 | 22.7 | 22.7 |

TABLE 2-continued

| Evaluation of matrix resin composition | Curing completion time | (minutes) | — | — | — | — | — | 246 |
| --- | --- | --- | --- | --- | --- | --- | --- | --- |
| | Viscosity at 30° C. | (Pa · sec) | 12.4 | 24.1 | 14.1 | 7.1 | 65.6 | 7.7 |
| | Viscosity A | (Pa · sec) | 0.09 | 0.11 | 0.05 | 0.04 | 0.12 | 0.05 |
| Evaluation of tow prepreg | AMS value | (kPa) | 37 | 31 | 29 | 25 | 33 | 44 |
| | Evaluation T | | A | A | A | A | A | A |
| | Resin content | (%) | 24.6 | 22.9 | 23.1 | 23.3 | 24.8 | 28.4 |
| Evaluation of composite material-reinforced pressure vessel | Curing temperature | (° C.) | 130 | 130 | 130 | 130 | 130 | 100 |
| | Burst pressure | (MPa) | 118 | 106 | 108 | 117 | 119 | 127 |
| | Appearance | | A | A | A | B | A | A |
| | Void | | A | A | A | A | A | A |

| | | | | Example | | | |
| --- | --- | --- | --- | --- | --- | --- | --- |
| | | | | 7 | 8 | 9 | 10 |
| Component (A) | Component (A1) | jER828 | | 37.5 | 50 | 25 | 25 |
| | | jER1001 | | | | | |
| | Component (A2) | CY-184 | | 12.5 | | 25 | 25 |
| | Component (A) other than components (A1) and (A2) | N-775 Preliminarily reacted epoxy resin | | | | | |
| Mixture of component (A) and component (D) | | MX-257 | | 50 | 50 | 50 | 50 |
| | | MX-154 | | | | | |
| | | MX-125 | | | | | |
| Component (B) | | DICY | | 4 | 4 | 4 | 4 |
| Component (C) | | Omicure 94 | | | 1 | | |
| | | Omicure 52 | | | | | |
| | | Omicure 24 | | | | | |
| | | DCMU99 | | | | | |
| | | 2MZA-PW | | | | 1 | 1 |
| | | 2PZCNS-PW | | | | | 1 |
| Epoxy resin curing agent other than component (B) | | DY9577 | | | | | |
| | | PN-40 | | | | | |
| | | MY-II | | | | | |
| Arbitrary component | | BYK A506 | | 0.3 | | | |
| Sum of component (A1-1) | | (parts by mass) | | 69 | 81.5 | 56.5 | 56.5 |
| Amount of component (D) blended (to 100 parts by mass of component (A)) | | (parts by mass) | | 22.7 | 22.7 | 22.7 | 22.7 |
| Evaluation of matrix resin composition | Curing completion time | (minutes) | | 328 | 154 | >360 | >360 |
| | Viscosity at 30° C. | (Pa · sec) | | 10.0 | 18.5 | 10.3 | 11.6 |
| | Viscosity A | (Pa · sec) | | 0.04 | 0.09 | 0.06 | 0.05 |
| Evaluation of tow prepreg | AMS value | (kPa) | | 36 | 46 | 37 | 41 |
| | Evaluation T | | | A | A | A | A |
| | Resin content | (%) | | 26.5 | 27.7 | 28.3 | 25.4 |
| Evaluation of composite material-reinforced pressure vessel | Curing temperature | (° C.) | | 100 | 130 | 130 | 130 |
| | Burst pressure | (MPa) | | 119 | 120 | 125 | 127 |
| | Appearance | | | B | A | A | A |
| | Void | | | A | A | A | A |

TABLE 3

| | | | Example | | | Comparative Example | | |
| --- | --- | --- | --- | --- | --- | --- | --- | --- |
| | | | 11 | 12 | 13 | 1 | 2 | 3 |
| Component (A) | Component (A1) | jER828 | 25 | 25 | 25 | 70 | 90 | 68 |
| | | jER1001 | | | | | | |
| | Component (A2) | CY-184 | 25 | 25 | 25 | | | |
| | Component (A) other than components (A1) and (A2) | N-775 Preliminarily reacted epoxy resin | | | | | | 32 |
| Mixture of component (A) and component (D) | | MX-257 | 50 | 50 | 50 | 30 | 10 | |
| | | MX-154 | | | | | | |
| | | MX-125 | | | | | | |
| Component (B) | | DICY | 5 | 5 | 5 | 4 | 4 | 4.8 |
| Component (C) | | Omicure 94 | | | | 1 | 1 | 1.2 |
| | | Omicure 52 | 2 | | | | | |
| | | Omicure 24 | | 2 | | | | |
| | | DCMU99 | | | 2 | | | |
| | | 2MZA-PW | | | | | | |
| | | 2PZCNS-PW | | | | | | |
| Epoxy resin curing agent other than component (B) | | DY9577 | | | | | | |
| | | PN-40 | | | | | | |
| | | MY-II | | | | | | |
| Arbitrary component | | BYK A506 | | 0.3 | 0.3 | 0.3 | 0.3 | 0.3 |
| Sum of component (A1-1) | | (parts by mass) | 56.5 | 56.5 | 56.5 | 88.9 | 96.3 | 68 |

TABLE 3-continued

| | | | | | | | |
|---|---|---|---|---|---|---|---|
| Amount of component (D) blended (to 100 parts by mass of component (A)) | | (parts by mass) | 22.7 | 22.7 | 22.7 | 12.5 | 3.8 | 0.0 |
| Evaluation of matrix resin composition | Curing completion time | (minutes) | 305 | 130 | >360 | — | — | — |
| | Viscosity at 30° C. | (Pa · sec) | 8.2 | 12.2 | 7.5 | 8.2 | 5.3 | 163.1 |
| | Viscosity A | (Pa · sec) | 0.05 | 0.08 | 0.05 | 0.03 | 0.02 | 0.09 |
| Evaluation of tow prepreg | AMS value | (kPa) | 33 | 32 | 26 | 20 | 20 | 46 |
| | Evaluation T | | A | A | A | A | A | A |
| | Resin content | (%) | 29.4 | 25.8 | 26 | 23.6 | 23.7 | 24.5 |
| Evaluation of composite material-reinforced pressure vessel | Curing temperature | (° C.) | 130 | 100 | 130 | 130 | 130 | 130 |
| | Burst pressure | (MPa) | 128 | 128 | 127 | 101 | 102 | 96 |
| | Appearance | | A | A | A | C | C | A |
| | Void | | A | A | A | B | B | C |

| | | | | Comparative Example | | | |
|---|---|---|---|---|---|---|---|
| | | | | 4 | 5 | 6 | 7 |
| Component (A) | Component (A1) | | jER828 | 75 | | 40 | 40 |
| | | | jER1001 | | | | |
| | Component (A2) | | CY-184 | 25 | | | |
| | Component (A) other than components (A1) and (A2) | | N-775 | | | | 30 |
| | | | Preliminarily reacted epoxy resin | | | 30 | |
| Mixture of component (A) and component (D) | | | MX-257 | | | 30 | 30 |
| | | | MX-154 | | 100 | | |
| | | | MX-125 | | | | |
| Component (B) | | | DICY | 4.8 | | 4 | 4 |
| Component (C) | | | Omicure 94 | 1.2 | | 1 | 1 |
| | | | Omicure 52 | | | | |
| | | | Omicure 24 | | | | |
| | | | DCMU99 | | | | |
| | | | 2MZA-PW | | | | |
| | | | 2PZCNS-PW | | | | |
| Epoxy resin curing agent other than component (B) | | | DY9577 | | 10 | | |
| | | | PN-40 | | | | |
| | | | MY-II | | | | |
| Arbitrary component | | | BYK A506 | 0.3 | 0.3 | 0.3 | 0.3 |
| Sum of component (A1-1) | | (parts by mass) | | 75 | 60 | 58.9 | 58.9 |
| Amount of component (D) blended (to 100 parts by mass of component (A)) | | (parts by mass) | | 0.0 | 66.7 | 12.5 | 12.5 |
| Evaluation of matrix resin composition | Curing completion time | (minutes) | | — | — | 170 | 184 |
| | Viscosity at 30° C. | (Pa · sec) | | 2.9 | 53.7 | 153.7 | 450.8 |
| | Viscosity A | (Pa · sec) | | 0.02 | 0.80 | 0.13 | 0.18 |
| Evaluation of tow prepreg | AMS value | (kPa) | | 10 | 90 | 34 | 62 |
| | Evaluation T | | | A | C | C | C |
| | Resin content | (%) | | 24.1 | 23.9 | 24.8 | 22.4 |
| Evaluation of composite material-reinforced pressure vessel | Curing temperature | (° C.) | | 130 | 130 | 100 | 100 |
| | Burst pressure | (MPa) | | 109 | 119 | 113 | 104 |
| | Appearance | | | C | A | A | A |
| | Void | | | B | A | A | A |

Each of the tow prepregs obtained in Examples 1 to 5 exhibited excellent process passing property, shape retaining property, and unwinding property, and the resin flow during curing was properly adjusted, and as a result, there were fewer voids in the fiber-reinforced composite material layer, thus the strength development efficiency of the reinforcing fiber was excellent and an excellent burst pressure was exhibited. Particularly, in Examples 1, 4, and 5 in which the component (A2) was concurrently used, a significantly excellent burst pressure was exhibited.

The tow prepregs obtained in Examples 6 to 13 also exhibited excellent process passing property, shape retaining property, and unwinding property, and the resin flow during curing was properly adjusted, and as a result, there were fewer voids in the fiber-reinforced composite material layer, thus the strength development efficiency of the reinforcing fiber was excellent, an excellent burst pressure was exhibited, and proper tack was obtained. It has been confirmed that particularly the matrix resin compositions used in Examples 6 to 8, 11, and 12 exhibit excellent low temperature curability as curing thereof is completed within 360 minutes at 100° C.

Tow prepregs as these can be suitably used in a composite material-reinforced pressure vessel using a liner such as a plastic liner.

In Comparative Examples 1 to 4 in which the content of the component (D) with respect to the component (A) was low, the viscosity of matrix resin composition was poorly adjusted and there was a problem in either or both of the appearance and voids of the composite material-reinforced pressure vessels obtained.

The tow prepreg obtained in Comparative Example 5 did not contain the component (B), thus had large tack (average maximum stress value) and exhibited poor unwinding property although the viscosity at 30° C. and viscosity A of the matrix resin composition were proper. In addition, the tow prepreg exhibited poor shape retaining property and thus was wound onto the mandrel while being folded while the step proceeded in the FW step. There is also a problem in process passing property and thus the single yarn was entangled from the reinforcing fiber bundle of the tow prepreg by the matrix resin composition attached to the roll surface and the tow prepreg was wound onto the roll when the tow prepreg was scraped on and passes through the roll surface in the FW step.

The tow prepreg obtained in Comparative Example 6 exhibited poor process passing property as the single yarn was entangled from the reinforcing fiber bundle of the tow prepreg by the matrix resin composition attached to the roll surface and the tow prepreg was wound onto the roll when the tow prepreg was scraped on and passes through the roll surface in the FW step.

The tow prepreg obtained in Comparative Example 7 exhibited poor unwinding property as the single yarn of the reinforcing fiber bundle of the tow prepreg was entangled by the stickiness of the tow prepreg surface of the lower layer during unwinding and it was not possible to properly conduct unwinding. In addition, the tow prepreg exhibited poor process passing property as the single yarn was entangled from the reinforcing fiber bundle of the tow prepreg by the matrix resin composition attached to the roll surface and the tow prepreg was wound onto the roll when the tow prepreg was scraped on and passes through the roll surface in the FW step.

Example 14

A commercially available one direction carbon fiber prepreg "TR350G125SM" (manufactured by Mitsubishi Rayon Co., Ltd.) was cut so as to have a length of 650 mm and a width of 64.2 mm based on the fiber direction and wound onto a mandrel which had an outer diameter of 10 mm and a length of 1400 mm and previously coated with a release agent by two layers so that the fiber direction of the prepreg was parallel (0°) to the axial direction of the mandrel. The tow prepreg fabricated in Example 6 were wound onto the mandrel onto which the prepreg was wound by two layers using an FW apparatus so as to be at ±450 with respect to the axial direction of the mandrel. A polyethylene terephthalate tape was wound onto the outermost layer and then suspended in a heating furnace, and the temperature inside the furnace was raised to 130° C. at 2° C./min, and the resultant mandrel was then held at 130° C. for 2 hours for curing.

The temperature inside the furnace was cooled to 60° C. at 1° C./min, the resultant mandrel was then taken out from the furnace and decentered from the mandrel using a decentering machine, thereby obtaining a composite material tubular body.

(Evaluation on Crush Strength of Tubular Body)

The composite material tubular body thus obtained was cut so as to have a length of 10 mm and the cut surface was polished, thereby fabricating a test piece. A load was applied to the test piece from above in a direction perpendicular to the axis, and the load when the test piece was broken was measured.

Comparative Example 8

A composite tubular body was obtained in the same manner as in Example 14 except that the tow prepreg fabricated in Comparative Example 1 was used.

The crush strength of the tubular body was evaluated in the same manner as in Example 14 using the composite tubular body thus obtained.

TABLE 4

| | | | | Example 14 | Comparative Example 8 |
|---|---|---|---|---|---|
| Innermost layer prepreg | | | | TR350G125SM | |
| Matrix resin of tow prepreg | Component (A) | Component (A1) | jER828 | 25 | 70 |
| | | Component (A2) | CY-184 | 25 | 0 |
| | Mixture of component (A) and component (D) | | MX-257 | 50 | 30 |
| | Component (B) | | DICY | 5 | 4 |
| | Component (C) | | Omicure 94 | 2 | 1 |
| | Arbitrary component | | BYK A506 | 0.3 | 0.3 |
| Crush strength (N) | | | | 979 | 874 |

By using the tow prepreg obtained in Example 6, a composite tubular body having a high crush strength was obtained. As described above, the tow prepreg of the present invention can also be suitably used in the uses required to have a torsional strength and a bending strength such as a golf shaft, a fishing rod, and a drive shaft.

INDUSTRIAL APPLICABILITY

The tow prepreg according to the present invention exhibits excellent drape property and tackiness and less stickiness and can be unwound at a high speed, and it is thus possible to provide a composite material-reinforced pressure vessel having fewer voids, a high burst pressure, and an excellent appearance by using such a tow prepreg.

The invention claimed is:

1. A tow prepreg comprising a reinforcing fiber bundle impregnated with a matrix resin composition, wherein
the matrix resin composition contains a component (A), a component (B), a component (C), and a component (D), wherein
the component (A) is an epoxy resin, the component (B) is dicyandiamide, the component (C) is a curing accelerator, and the component (D) is a core-shell rubber particle and
a content of the component (D) with respect to 100 parts by mass of the component (A) is from 22.7 to 70 parts by mass,
a viscosity of the matrix resin composition is from 3 Pas to 80 Pa·s at 30° C., and
a minimum viscosity to be obtained when a viscosity of the matrix resin composition is measured by raising a temperature from room temperature to 130° C. at a rate of temperature rise of 2.0° C./min is from 0.04 Pa·s to 1 Pa·s.

2. The tow prepreg according to claim 1, wherein the component (A) contains a component (A1-1) and a component (A2), wherein
the component (A1-1) is a bifunctional epoxy resin which is liquid at 25° C. and has one or more aromatic ring in the molecule and the component (A2) is a bifunctional epoxy resin which has a viscosity of 15 Pa·s or less at 25° C. and does not have an aromatic ring in the molecule.

3. The tow prepreg according to claim 2, wherein the component (A2) is a component (A2-1), wherein
the component (A2-1) is a bifunctional epoxy resin which has a viscosity of 15 Pa·s or less at 25° C. and does not have an aromatic ring in the molecule but has one or more alicyclic structure in the molecule.

4. The tow prepreg according to claim 3, wherein a content of the component (A2-1) in the component (A) is from 2 to 80 parts by mass with respect to 100 parts by mass of the component (A).

5. The tow prepreg according to claim 1, wherein the matrix resin composition has a curing completion time of shorter than 360 minutes at 100° C. when the curing completion time is measured using a curelastometer.

6. The tow prepreg according to claim 1, wherein a total content of the component (B) and the component (C) with respect to 100 parts by mass of the component (A) is from 2 to 12 parts by mass.

7. The tow prepreg according to claim 1, wherein a content of the component (C) with respect to 100 parts by mass of the component (A) is from 0.1 to 10 parts by mass.

8. The tow prepreg according to claim 1, wherein the component (C) is a urea derivative or an imidazole derivative.

9. The tow prepreg according to claim 1, wherein the reinforcing fiber bundle is a carbon fiber bundle.

10. A composite material-reinforced pressure vessel comprising:
a metal liner or a resin liner; and
a reinforcing layer disposed so as to cover a part or the whole of a surface of the metal liner or the resin liner, wherein
the reinforcing layer is a cured product of the tow prepreg according to claim 1.

11. A method of producing a composite material-reinforced pressure vessel, the method comprising:
winding the tow prepreg according to claim 1 onto a rotating metal liner or resin liner to fabricate a pressure vessel intermediate body; and
heating the pressure vessel intermediate body to cure the matrix resin composition contained in the tow prepreg.

12. The tow prepreg according to claim 1, wherein a content of the component (D) with respect to 100 parts by mass of the component (A) is from 30 to 45 parts by mass.

13. A method of producing a composite material-reinforced pressure vessel, the method comprising:
preparing a matrix resin composition which contains a component (A), a component (B), a component (C), and a component (D), wherein the component (A) is an epoxy resin, the component (B) is dicyandiamide, the component (C) is a curing accelerator, and the component (D) is a core-shell rubber particle and a content of the component (D) with respect to 100 parts by mass of the component (A) is from 22.7 to 70 parts by mass and has a viscosity of from 3 Pa·s to 80 Pa·s at 30° C. and a minimum viscosity of from 0.04 Pa·s to 1 Pa·s to be obtained when a viscosity of the matrix resin composition is measured by raising a temperature from room temperature to 130° C. at a rate of temperature rise of 2.0° C./min;
impregnating a reinforcing fiber bundle with the matrix resin composition to fabricate a resin-impregnated reinforcing fiber bundle;
winding the resin-impregnated reinforcing fiber bundle onto a rotating metal liner or resin liner to fabricate a pressure vessel intermediate body; and
heating the pressure vessel intermediate body to cure the matrix resin composition contained in the resin-impregnated reinforcing fiber bundle.

14. The method according to claim 13, wherein a content of the component (D) with respect to 100 parts by mass of the component (A) is from 30 to 45 parts by mass.

* * * * *